United States Patent
Egner et al.

(10) Patent No.: US 10,452,824 B2
(45) Date of Patent: Oct. 22, 2019

(54) METHOD AND APPARATUS FOR OPTIMIZED ACCESS OF SECURITY CREDENTIALS VIA MOBILE EDGE-COMPUTING SYSTEMS

(71) Applicant: Dell Products, LP, Round Rock, TX (US)

(72) Inventors: Will A. Egner, Cedar Park, TX (US); Liam B. Quinn, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 108 days.

(21) Appl. No.: 15/657,490

(22) Filed: Jul. 24, 2017

(65) Prior Publication Data

US 2019/0026450 A1    Jan. 24, 2019

(51) Int. Cl.
  *G06F 21/32* (2013.01)
  *H04L 29/06* (2006.01)
  *H04W 8/18* (2009.01)
  *H04W 4/029* (2018.01)
  *G06F 21/44* (2013.01)
  (Continued)

(52) U.S. Cl.
  CPC .............. *G06F 21/32* (2013.01); *G06F 21/44* (2013.01); *H04L 9/3239* (2013.01); *H04L 9/3297* (2013.01); *H04L 63/0892* (2013.01); *H04W 4/029* (2018.02); *H04W 8/18* (2013.01); *H04W 12/06* (2013.01); *G06F 2221/2111* (2013.01); *H04L 2209/38* (2013.01)

(58) Field of Classification Search
  CPC .. G06F 21/32; G06F 21/44; G06F 2221/2111; H04L 63/0892; H04L 9/3239; H04L 9/3297; H04L 2209/38; H04W 12/06; H04W 4/029; H04W 8/18
  See application file for complete search history.

(56) References Cited

U.S. PATENT DOCUMENTS

| | | | |
|---|---|---|---|
| 7,885,981 B2 * | 2/2011 | Kaufman | G06F 16/26 707/802 |
| 8,768,618 B1 | 7/2014 | Christie | |
| 9,137,324 B2 | 9/2015 | Ims | |

(Continued)

*Primary Examiner* — Mekonen T Bekele
(74) *Attorney, Agent, or Firm* — Prol Intellectual Property Law, PLLC; H. Kenneth Prol

(57) ABSTRACT

A method for secure access to a mobile edge-computing system device based on a subscriber location fingerprint may comprise receiving a request to access the mobile edge-computing system, a first personal authorization credential record, and an encrypted token from a requesting client, associating the first personal authorization credential record with a block chain location fingerprint for the subscribing client, including a plurality of time-stamped records of a plurality of estimated or measured location state variables of the subscribing client and an associated confidence interval representing an accuracy of those variables, decrypting the location fingerprint, receiving a requesting client location measurement, predicting a current location for the subscribing client and an associated current confidence interval based on recent location state variables in the location fingerprint, and allowing the requesting client access to the mobile edge-computing system when the received requesting client location measurement falls within the value of the current confidence interval.

13 Claims, 10 Drawing Sheets

(51) Int. Cl.
*H04W 12/06* (2009.01)
*H04L 9/32* (2006.01)

(56) References Cited

U.S. PATENT DOCUMENTS

| | | | |
|---|---|---|---|
| 9,374,678 | B2 | 6/2016 | Gupta |
| 9,459,339 | B2 | 10/2016 | Mansour |
| 9,537,938 | B2 * | 1/2017 | Thomas .................. H04L 67/10 |
| 2005/0166041 | A1 | 7/2005 | Brown |
| 2009/0124284 | A1 * | 5/2009 | Scherzer ........... H04M 1/72561 |
| | | | 455/552.1 |
| 2013/0006816 | A1 * | 1/2013 | Nuzzi ................ G06Q 30/0261 |
| | | | 705/27.1 |
| 2013/0031240 | A1 | 1/2013 | Byzek |
| 2014/0368386 | A1 | 12/2014 | Mansour |
| 2015/0249907 | A1 | 9/2015 | Gupta |
| 2016/0057124 | A1 | 2/2016 | Boyle |
| 2016/0223341 | A1 * | 8/2016 | Engelen ................ G01C 21/206 |
| 2016/0283920 | A1 | 9/2016 | Fisher |
| 2017/0064037 | A1 * | 3/2017 | Das ....................... H04L 67/322 |
| 2017/0109685 | A1 | 4/2017 | Bianchi |
| 2017/0155652 | A1 * | 6/2017 | Most ................... H04L 43/0876 |
| 2017/0180388 | A1 * | 6/2017 | Belz ...................... H04L 63/105 |
| 2018/0367314 | A1 * | 12/2018 | Egner ................... H04L 9/3247 |
| 2019/0020657 | A1 * | 1/2019 | Egner .................... H04L 63/10 |

\* cited by examiner

| Time of Calculation (Time Stamp) | Estimated Position | Estimated Velocity | Estimated Acceleration | Most Popular Location | Confidence Interval | Link to Personal Credential Data Record |
|---|---|---|---|---|---|---|
| 16:30:27; 6/1/17 | 40.73324, -73.98 | 3 km/h | 0 km/h² | 40.698, -74.32 | 0.01 m | Link 1 |
| 16:35:18; 6/1/17 | 40.698, -74.32 | 0 km/h | 0 km/h² | 40.698, -74.32 | 1 m | Link 1 |

Block Chain of Subscriber Location Fingerprints
502

504 — Confidence Interval column callout
506 — Link to Personal Credential Data Record column callout

FIG. 5

| Type of User Credential | Value of User Credential |
|---|---|
| Username | User 1 |
| Password | PASS |
| Private Key | (Long-String Alpha-Numberic Value) |
| Visual ID Signature | (Link to facial recognition data record, retinal scan data record, movement detection data record, etc.) |
| Voice ID Signature | (Link to voice recognition data record) |
| Hand ID Signature | (Link to gesture detection data record, fingerprint detection data record, etc.) |
| Location Signature | (Link to most recent time-stamped block in location fingerprint block chain) |
| Secret Question | What was the name of your first pet? |
| Secret Answer | Scooby |
| Allow Location Prediction? | Yes |

User Credential Data Record 602

*FIG. 6*

| Compute | Internet Address | Company or Organization | Access radio Technology | CPU Core Units | Memory Available | Security and performance history address (Base 58 with check encode payload) |
|---|---|---|---|---|---|---|
| Cyber cafe 1 | 8.192.1.76 | Cloud Provider 1 | Wi-Fi, WiGig, LTE Unlicensed | 3 | 6 Gbytes | 1hvzSofGwT8cjb8JU7nBsCSfEV QQX5u9CL |
| Carrier cloud services 1 | 32.0. 196.70 | Carrier 1 | Wi-Fi, LTE | 1 | 2 Gbytes | 1LQoTPYy1TyERbNV4ZZbhEmgy fAipC6eqL |
| Carrier cloud services 2 | 70.192. 0.65 | Carrier 2 | Wi-Fi, LTE | 1 | 2 Gbytes | 1FvRHWhHBBZA8cGRRsGiAeqE zUmjKJQWR |
| Cyber cafe 2 | 8.192.1.76 | Local Enterprise | Wi-Fi, LTE Unlicensed | 4 | 8 Gbytes | 1Q3q6taTsUiv3mMemEuQQJ9s GLEGaSjo81 |
| Web Services 2 | 96.127.1.9 4 | Cloud Provider 2 | LTE | 0.5 | 1 Gbyte | 1LqJZz1D9yHxG4cLkdujnqG5jN NGmPeAMD |

700 — (table)
704, 706, 708, 710, 712 — column/row indicators
714 — grouping indicator

FIG. 7

METHOD AND APPARATUS FOR OPTIMIZED ACCESS OF SECURITY CREDENTIALS VIA MOBILE EDGE-COMPUTING SYSTEMS

FIELD OF THE DISCLOSURE

The present disclosure generally relates to managing security and availability of data accessed by information handling systems via mobile edge-computing systems, and more specifically to optimizing delivery of security credentials and nomadic computing resources via mobile edge-computing systems.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling needs and requirements vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. Further, the information handling system may include security capabilities for identifying and inhibiting access by unauthorized clients.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 5 is a graphic diagram illustrating a block chain of subscriber location fingerprints according to an embodiment of the present disclosure;

FIG. 6 is a graphic diagram illustrating a personal authorization credential record according to an embodiment of the present disclosure;

FIG. 7 is a graphic diagram illustrating a collection of advertisement messages for a list of mobile edge computing systems according to an embodiment of the present disclosure;

The use of the same reference symbols in different drawings may indicate similar or identical items.

DETAILED DESCRIPTION OF THE DRAWINGS

Figure 1:
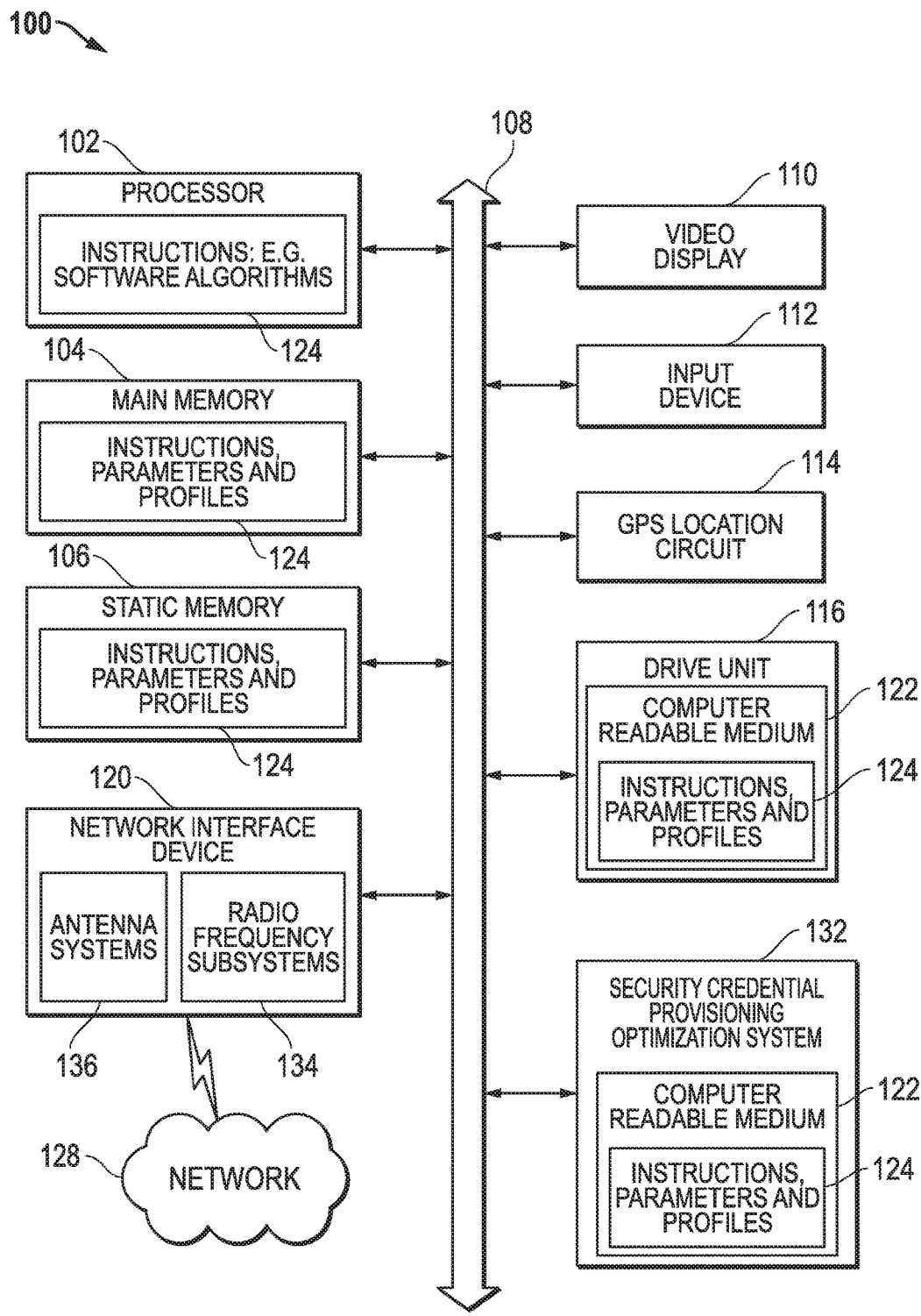
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

As mobile computing infrastructure evolves worldwide to enable mobile information handling systems to transmit and receive larger amounts of data more quickly and easily while on the move, tasks previously completed only on a single, stationary information handling system are now being completed across multiple information handling systems. However, there is a competing need to keep these multiple information handling systems lightweight. One solution to these contrasting needs is to make competing services previously confined to a single information handling system (stationary or mobile) available across a plurality of information handling systems (stationary or mobile), on command, via mobile edge-computing system devices connected to the cloud. In such a system, called a nomadic computing services system, each subscriber to the system may have access to his or her data and applications, including client information, payment information, personal files, and bank account details through any of a plurality of information handling systems the subscriber may use to access the mobile edge-computing system device.

Security systems operating across a plurality of information handling systems of a subscriber to nomadic computing services may require a client to provide proper credentials in order to access the nomadic computing services. The security system may operate across several devices, including the subscribing client's information handling systems, one or more mobile-edge computing system (MEC) devices, one or more mobile edge authenticating system (MEA) devices, and a remotely located authentication server. One or more of the MEC systems may serve as a MEC system device if trusted by the security system of the embodiments herein. One example embodiment of such a security system may take the form of a security credential provisioning system. The security credential provisioning system may check security credentials received from a client's information handling system against security credentials received from the authentication server, and only grant access to clients providing correct credentials.

In embodiments of the present disclosure, the authentication server may generate, maintain and/or provision an optimal mobile edge-authentication system with subscribing client security credentials. The mobile edge-authentication (MEA) system, such as a designated MEC system, in an embodiment may use the provisioned subscribing client security credentials to positively identify a requesting information handling system as belonging to the verified subscribing user, and identify an optimal mobile edge-computing system. In embodiments of the present disclosure, the optimal mobile edge-computing system may provide the requesting client information handling system access to nomadic computing resources belonging to the subscribing client. In some example embodiments, the mobile edge-computing system and the mobile edge-authenticating system may operate on the same device.

In such security systems, the mobile edge-authentication system device may execute the code to compare the received credentials, rather than the client information handling system, in order to lower the overhead responsibilities of the client's information handling device and keep the client's device lightweight and slim. However, because the client may access the nomadic computing services from anywhere in the world, via any information handling system, and because each mobile edge-authentication system device may only service a preset geographical area, the client may attempt to provide the proper credentials via any of mobile edge-authentication systems system in the world. In order to shift the responsibilities associated with comparing security credentials to the mobile edge authentication device, a solution is needed to preemptively estimate which mobile edge authentication system device the client may use to access the nomadic computing resources in the future, and to deliver the personal authorization credential records from the authentication server to the mobile edge authentication system device in anticipation of the client's access attempt. A solution is also needed to determine whether the mobile edge authentication system device and/or mobile edge computing system device through which the client attempts to access the nomadic computing resources can be trusted to deliver the requested access securely and have the necessary resources available to complete the request.

Embodiments of the present disclosure provide a solution to the former problem described above by estimating the future location of a subscribing client and provisioning that subscribing client's credentials to a trusted mobile edge authentication system device servicing the area surrounding the estimated future location. The future location may be estimated in embodiments of the present disclosure, for example, based on a recorded IP address for the locations most often used by the subscriber, or by applying a Kalman filter to previously recorded locations for the subscribing client to determine the client's most likely path of travel and final destination.

Relative trust of the mobile edge-computing and/or mobile edge-authentication systems in embodiments of the present disclosure may be determined through maintenance at the authentication server of encrypted historical trust reference block chains. In embodiments of the present disclosure, the authentication server may pre-provision client security credentials at a mobile edge-authentication system device that is both located nearby an estimated future location, and associated with a historical trust reference meeting or exceeding a threshold value. By pre-provisioning the client security credentials at a trusted mobile edge-authentication server prior to arrival of the client at the estimated future location, the security credential provisioning system may make the process of authenticating a requesting subscriber more efficient without adding overhead responsibility and unnecessary hardware to the client information handling system.

Upon arrival of the client at the estimated future location and verification of the subscribing user at the mobile edge authentication system, the security credential provisioning system in embodiments of the present disclosure may also identify a trusted mobile edge computing system with access to necessary resources to provide the requested access to the subscriber's nomadic computing resources. When the subscribing client requests access to the nomadic computing resources in an embodiment, the mobile edge computing system, such as the MEA system, serving as a hub to determine an optimal MEC system for edge computing may receive a broadcast encrypted historical trust reference blocks from each of several mobile edge compute system devices operating within a preset range of the estimated future location. The security credential provisioning system in an embodiment may the access the encrypted historical trust reference block chains for each of the candidate MECs to determine an optimal mobile edge computing partner for the requested access, which may be associated with a highest historical trust reference, an availability of the most computing resources, a minimum threshold historical trust reference, a minimum threshold computing resources, or a combination of any of these factors.

FIG. 1 illustrates an information handling system 100 similar to information handling systems according to several aspects of the present disclosure. In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP), a base station transceiver, a wireless telephone, a land-line telephone, a control system, a camera, a scanner, a facsimile machine, a printer, a pager, a personal trusted device, a web appliance, or any other suitable machine capable of executing a set of instructions (sequential or otherwise) that specify actions to be taken by that machine, and can vary in size, shape, performance, price, and functionality.

In a networked deployment, the information handling system 100 may operate in the capacity of a server or as a client user computer in a server-client user network environment, or as a peer computer system in a peer-to-peer (or distributed) network environment. In a particular embodiment, the computer system 100 can be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

FIG. 1 shows an information handling system 100 capable of administering each of the specific embodiments of the present disclosure. For example, the information handling system 100 can represent a gateway device operating as wireless network access point located anywhere within a network of access points or may also represent aspects of a mobile information handling system in communication with the gateway device, or an authentication server in communication with the gateway device. A gateway device, and/or an authentication server may execute instructions via a processor for a security credential provisioning system according to embodiments disclosed herein. The security credential provisioning system of various embodiments of the present disclosure may operate in some example embodiments as a software agent, in whole or in part, within a gateway device or other wireless network access point while other portions of the security credential provisioning system may operate on remote authentication server systems or within client information handling systems operating within the same network as the gateway device. Information handling system 100 may also represent a networked server or other system and administer some or all aspects of the security credential provisioning system via instructions executed on a processor according to various embodiments herein involving remote operation of such systems.

Information handling system 100 can include devices or modules that embody one or more of the devices or execute instructions for the one or more systems and modules described above, and operates to perform one or more of the methods described above. The information handling system 100 may execute code instructions 124 that may operate on servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 102 such as a central processing unit (CPU), control logic or some combination of the same. Any of the processing resources may operate to execute code that is either firmware or software code. Moreover, the information handling system 100 can include memory such as main memory 104, static memory 106, computer readable medium 122 storing instructions 124 of the security credential provisioning system 132, and drive unit 116 (volatile (e.g. random-access memory, etc.), nonvolatile (read-only memory, flash memory etc.) or any combination thereof). The information handling system 100 can also include one or more buses 108 operable to transmit communications between the various hardware components such as any combination of various input and output (I/O) devices.

As shown, the information handling system 100 may further include a video display 110. The video display 110 in an embodiment may function as a liquid crystal display (LCD), an organic light emitting diode (OLED), a flat panel display, a solid state display, or a cathode ray tube (CRT). Additionally, the information handling system 100 may include an alpha numeric input device 112, such as a keyboard, and/or a cursor control device, such as a mouse, touchpad, or gesture or touch screen input, and a GPS location circuit 114 capable of measuring a geographic location in three-dimensions, a velocity, and an acceleration of a mobile, semi-mobile, and/or stationary information handling system.

The information handling system 100 can also include a disk drive unit 116. The information handling system 100 can also represent a server device whose resources can be shared by multiple client devices, or it can represent an individual client device, such as a desktop personal computer, a laptop computer, a tablet computer, a wall-mounted display, or a mobile Smartphone in example embodiments.

Network interface device 120 represents a NIC disposed within information handling system 100, on a main circuit board of the information handling system, integrated onto another component such as processor 102, in another suitable location, or a combination thereof. The network interface device 120 can include another information handling system, a data storage system, another network, a grid management system, another suitable resource, or a combination thereof. Network interface device 120 in an embodiment may operably connect to a network 128. Connection to network 128 may be wired or wireless.

The network interface device shown as wireless adapter 120 can provide connectivity to a network 128, e.g., a wide area network (WAN), a local area network (LAN), wireless local area network (WLAN), a wireless personal area network (WPAN), a wireless wide area network (WWAN), or other network. Connectivity may be via wired or wireless connection. Wireless adapter 120 may include one or more radio frequency subsystems 134 with transmitter/receiver circuitry, wireless controller circuitry, amplifiers and other circuitry for wireless communications. The wireless adapter 120 may also include antenna system 136 which may be tunable antenna systems for use with the system and methods disclosed herein. The radio frequency subsystems 134 include wireless controllers to manage authentication, connectivity, communications, power levels for transmission, buffering, error correction, baseband processing, and other functions of the wireless adapter 120.

The information handling system 100 can include a set of instructions 124 that can be executed to cause the computer system to perform any one or more of the methods or computer based functions disclosed herein. For example, instructions 124 may execute a security credential provisioning system, software agents, or other aspects or components. Similarly instructions 124 may execute the security credential provisioning system disclosed herein for preemptively transmitting personal authorization credential records from an authentication server to a mobile edge-computing system servicing an area including an estimated future position of the client, in anticipation of the client attempting to access nomadic computing resources via the mobile edge-computing system device.

Various software modules comprising application instructions 124 may be coordinated by an operating system (OS), and/or via an application programming interface (API). An example operating system may include Windows®, Android®, and other OS types known in the art. Example APIs may include Win 32, Core Java API, or Android APIs.

The disk drive unit 116 and the security credential provisioning system 132 may include a computer-readable medium 122 in which one or more sets of instructions 124 such as software can be embedded. Similarly, main memory 104 and static memory 106 may also contain a computer-readable medium for storage of one or more sets of instructions, parameters, or profiles 124 including a table of personal authorization credential records, a client/gateway trust table, and/or a plurality of block chains, where each block chain includes historical positional data for a single subscriber to a nomadic computing services system. The disk drive unit 116 and static memory 106 also contain space for data storage. Further, the instructions 124 may embody one or more of the methods or logic as described herein. For example, instructions relating to the security credential provisioning system software algorithms may be stored here. In a particular embodiment, the instructions, parameters, and profiles 124 may reside completely, or at least partially, within the main memory 104, the static memory 106, and/or within the disk drive 116 during execution by the processor 102 of information handling system 100. As explained, some or all of the security credential provisioning system may be executed locally or remotely. For example, portions of the security credential provisioning system may be executed at a mobile edge-computing system while other portions of the security credential provisioning system may be executed at a remotely located authentication server. The main memory 104 and the processor 102 also may include computer-readable media.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The security credential provisioning system 132 and the drive unit 116 may include a computer-readable medium 122 such as a magnetic disk in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The information handling system 100 may also include a security credential provisioning system 132 that may be operably connected to the bus 108. The security credential provisioning system 132 computer readable medium 122 may also contain space for data storage. The security credential provisioning system 132 may perform tasks related to granting access to a plurality of information handling systems after identifying the requesting client as an authorized subscriber. The security credential provisioning system 132 may reside in a mobile edge-computing system device in communication with an information handling system and with one or more cloud computing resources. In an embodiment, the mobile edge-computing system device may operate to police access by a plurality of client information handling systems to a subscriber's nomadic computing resources, located on a cloud computing device, or on a remote server in communication with the mobile edge-computing system. The memory 104 may store a subscriber's nomadic computing data, and the processor 102 may operate to perform code instructions of a nomadic computing service. In other embodiments, the computing data and processing capabilities of the nomadic computing service may reside outside the information handling system 100, and the mobile edge-computing system device may operate to police communication between a mobile information handling system and the nomadic computing services residing outside the information handling system 100.

The security credential provisioning system 132 residing within a mobile edge-computing system in an embodiment may control access to a subscriber's nomadic computing services by authenticating a requesting client is an authorized subscriber to that content. In doing so, the security credential provisioning system 132 may access a plurality of block chains stored in the memory 104, and identify the block chain associated with the requesting client. Each block chain may contain a plurality of "blocks," or time-stamped records of positional data for a subscriber. Each block may be encrypted, and may include a plurality of state variables indicating a subscriber's geographic location, velocity, and acceleration at the time of the time-stamp, as well as an identification of the location from which the client most often access nomadic computing services, a pointer to a personal authorization credential record, and a pointer to a client/gateway trust table. The state variables of a block may be either measured or estimated based on previous measured state variables, and each time-stamped group of state variables may be associated with a confidence interval representing the calculated accuracy of the measurement or estimation of the state variables at the time given in the time-stamp associated with those state variables. The memory 104 may store a plurality of block chains, and may be located at the mobile edge-computing system device, at a cloud computing resource, or at a node within the mobile edge-computing system device network. In an example embodiment, the memory 104 may be located within a remotely located authentication server in communication with the mobile edge-computing system device.

The block chain associated with a subscribing client, along with the personal authorization credential record and client/gateway trust table data record to which the block chain contains pointers may be transmitted to a mobile edge-computing system device servicing an area including an estimated future location of the subscribing client, in anticipation of the client requesting access to the nomadic computing resources at that location at a later time, according to an embodiment of the present disclosure. The future location may be estimated in embodiments of the present disclosure, for example, based on a recorded IP address for the locations most often used by the subscriber, or by applying a Kalman filter to previously recorded locations for the subscribing client to determine the client's most likely path of travel. Upon the client reaching the future estimated location, the client may transmit a request for access, a client identification, and an encryption key to the mobile edge-computing system device in an embodiment. The mobile edge-computing system device in an embodiment may then locate the client's previously received block-chain using the client identification, and decrypt the block-chain using the received encryption key. The memory 104 in an embodiment may store a plurality of encryption schemes, wherein each scheme is associated with a subscriber. Each subscriber's information handling systems may include a security credential provisioning system 132 agent or API that receives an encryption key identifying the encryption scheme assigned to that subscriber's block chain by the mobile edge-computing system. Upon requesting access to that subscriber's nomadic computing services, the security credential provisioning system 132 agent operating on the subscriber's information handling system may transmit this previously received encryption key back to the mobile edge-computing system in order to decrypt the block chain identified as being associated with the subscriber whose nomadic computing services are requested.

Once the subscriber's block chain has been identified and decrypted, the security credential provisioning system 132 in an embodiment may locate the personal authorization credential record using the pointers in the subscriber's block chain, and compare one or more personal authorization credential record values within the personal authorization credential record to credentials transmitted from the requesting information handling system. If the credentials match, in an embodiment, the mobile edge-computing system device may allow access to the nomadic computing resources of the subscribing client. If the credentials do not match, in an embodiment, the mobile edge-computing system device may refuse access to the nomadic computing resources of the subscribing client, and may transmit an instruction to the authentication server to lock the subscribing client's account.

Upon granting access to the nomadic computing resources of the subscribing client in an embodiment, the mobile edge-computing system device may identify the computing resources (e.g. processing power, memory available, bandwidth) needed to provide the requested access, and determine whether it has access to those required resources. If the mobile edge-computing system device determines it does not have access to the required resources, it may access the client/gateway trust table in an embodiment, identify one or more trusted mobile edge-gateway devices servicing the area including the subscribing client's current location, and prompt the client to choose one of those identified mobile edge-gateway devices for accessing the nomadic computing resources.

In an embodiment, the security credential provisioning system 132 may communicate with the main memory 104, the processor 102, the video display 110, the alpha-numeric input device 112, the GPS location circuit 114, and the network interface device 120 via bus 108, and several forms of communication may be used, including ACPI, SMBus, a 24 MHZ BFSK-coded transmission channel, or shared memory.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module can also include a combination of the foregoing examples of hardware or software. Note that an information handling system can include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

Figure 2:
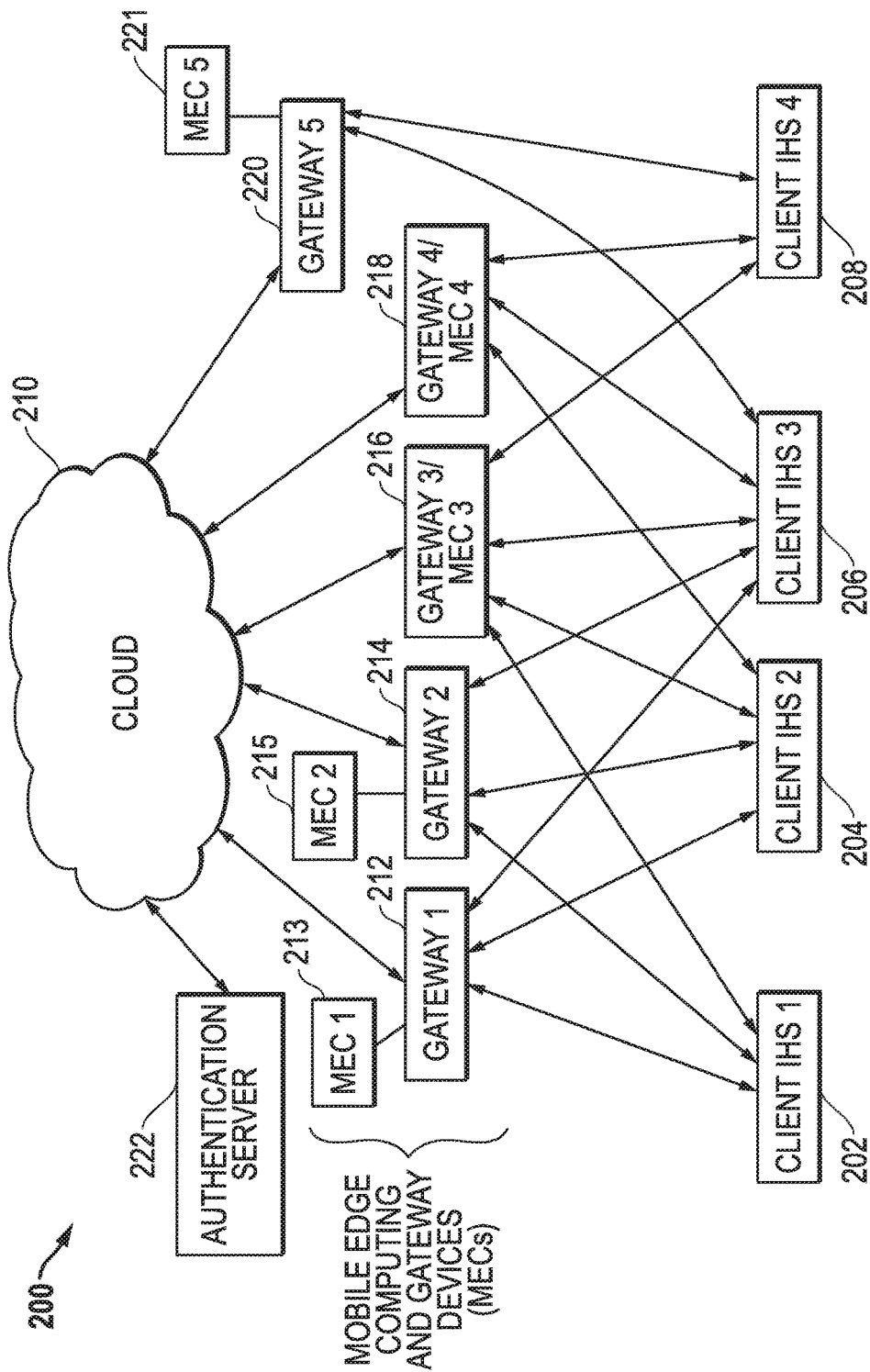
FIG. 2 is a block diagram illustrating a mobile edge-computing system device policing access to a subscriber's nomadic computing services according to an embodiment of the present disclosure.

FIG. 2 is a block diagram illustrating a mobile edge computing (MEC) network 200 and its availability at the edge of the interne to local information handling systems according to an embodiment of the present disclosure. Client information handling systems 202, 204, 206, and 208 may be located within range and have access to mobile edge compute resources 213, 215, 216, 218, and 221 via a plurality of wireless gateways device 212, 214, 216, 218 and 220 according to various embodiments. It is understood that a mobile edge computing system may be located near a gateway such as MEC 1 at 213 and Gateway 1 at 212 in some embodiments. MEC resources 213, 215, 216, 218, and 221 may include a locally placed computing system or server near one or more access points, base stations, or other edge transmitters (gateways 212, 214, 216, 218 and 220) making edge computing resources available to a wireless area. In other embodiments, a mobile edge computing system may be co-located as part of a wireless gateway such as shown with Gateway 3/MEC 3 at 216 and Gateway 4/MEC 4 at 218 whereby the wireless gateway may provide one option for mobile edge computing services to client information handling systems.

The plurality of client information handling systems 202-208, as shown in FIG. 2, may belong to a single subscribing client. For example, the network 200 in an embodiment may include client information handling system (IHS) 1 202, client IHS 2 204, client IHS 3 206, and client IHS 4 208. In some aspects, client information handling systems 202, 204, 206, and 208 may be an IoT device, a thin client information handling system, a smartcard, a mobile information handling system, or any other information handling system with wireless access and seeking mobile edge computing resources. For example, in an embodiment, the client IHS 1 202 may be a mobile smart phone, the client IHS 2 204 may be a mobile tablet computer, the client IHS 3 206 may be a desktop computer, and the client IHS 4 208 may be a wall-mounted computing display. Each of the plurality of subscribing client information handling systems 202-208 may be located in the same or different geographical areas.

Each of the gateway devices 212, 214, 216, 218, and 220 in an embodiment may service different geographical areas, and thus, may service all, a portion of, or none of the subscribing client information handling systems 202-208, depending on the geographical locations of the subscribing client information handling systems 202-208, as described in greater detail below. For example, as shown in FIG. 2, gateways 1-4 212, 214, 216, and 218 may be in communication with each of the client information handling systems 1-4 202-208, while gateway 5 220 is only in communication with client IHSs 3 206 and 4 208.

Each wireless gateway device 212, 214, 216, 218 and 220 may be connected to an internet backbone and cloud network 210 for connection to internet resources or other cloud connected resources. For example, cloud connectivity 210 may be via wired Ethernet connectivity to backhaul connection of the greater internet infrastructure. Additional resources may include an authentication server 222 which also may house or run all or part of the various aspects of the security credential provisioning system. For example, an authentication server 222 may provide trusted compute policy from an enterprise or other organization or updates to the same to a security credential provisioning system. In other embodiments, the authentication server 222 may be a secure location where historical trust reference data may be stored, such as that secured by block chaining, and made available to the security credential provisioning system. In other embodiments, historical trust references may be stored at another location such as one closer to a broker node.

Subscribers to a nomadic computing services system in an embodiment may be capable of accessing computing services associated with that subscriber at any client information handling system, including IHSs 1-4 202-208. The subscriber's sensitive private data in an embodiment may be stored at a cloud computing resource within the cloud 210, but may be accessed at any of the subscribing client's information handling systems, including IHSs 1-4 202-208, using the nomadic computing services system. Each of the mobile edge-computing system devices 1-4 213, 215, 216, 518, and/or 221 in an embodiment may work with the authentication server 222 to police access to a subscriber's data via any client information handling system. The authentication server 222 in an embodiment may include a memory storing one or more block chains of information detailing measured locations of each known client information handling system belonging to a subscriber, as well as estimated locations of the subscribing client, and personal authorization credential records. The authentication server 222 in an embodiment may also operate to issue personal authorization credential records to valid MEA system nodes, and encryption tokens to authenticated subscribers and authenticated subscriber information handling systems. The authentication server 222 in an embodiment may encrypt and decrypt the stored block chains for each subscriber according to the issued personal authorization credential records and encryption tokens. In order to gain access to the subscriber's nomadic computing services, a mobile edge-computing device in an embodiment may first require the client information handling system requesting access to show it is in use by the authorized subscriber.

As described in greater detail below, the authentication server 222 in an embodiment may estimate the future location of a subscribing client, for example, by using a Kalman filter applied to earlier recorded locations of the client, and/or by identifying the IP address of the location at which the client most often accesses nomadic computing resources, then proactively transmitting the block-chain, and personal authorization credential records to a trusted MEC or gateway geographically closest to the estimated future client location having memory resources available for storage of the transmitted data records, in anticipation of the client attempting to access the nomadic computing resources at that location.

The authentication server 222 in an embodiment may determine the suitability of an MEC device to serve as an MEA device authentication node by request for and receipt of access to historical trust references for the MEC device identified in a predicted location for a user. Further, the authentication server 222 may also determine from a message from the MEC device indicating whether available memory or other resources at that device are capable to operate as an MEA authentication node. For example, the authentication server 222 in an embodiment may request and receive a message indicating gateway 2 214 does not have access to the memory space needed to store the client's credentials (e.g. location fingerprint block-chain, and personal authorization credential record), and may not transmit the client's credentials to gateway 2 214 as a result. As another example, the authentication server 222 in an embodiment may request and receive a message indicating gateway 3/MEC 3 216 does have access to the memory space needed to store the client's credentials and has a minimum level of trust to serve as an authentication node. Then the authentication server 222 may transmit the block-chain, and personal authorization credential records to gateway 3/MEC 3 216 in anticipation of the client attempting to access nomadic computing resources via gateway 3/MEC 3 216.

In an example embodiment, a broker node may operate to run all or part of the various aspects of the security credential provisioning system and may be one of the MECs 213, 215, 216, 218, and 221 or a gateway 212, 214, 216, 218 and 220 with compute capability. For example, the predicted future location determined by the authentication server 222 in an embodiment may fall within the range of the broker node, and that broker node may receive the personal credential data record from the authentication server 222 in anticipation of the client attempting to access nomadic computing resources via broker node in the future.

One or more of the client information handling systems 202, 204, 206, and/or 208 in an embodiment may later attempt to access nomadic computing resources via the broker node in receipt of the personal credential data record. For example, in an embodiment, client IHS 1 202 may request access to the client nomadic computing resources via gateway 3/MEC 3 216 acting as the broker node. In such an embodiment, the security credential provisioning system operating at gateway 3/MEC 3 216 may operate to grant access to client IHS 1 202 of the client nomadic computing resources only upon receipt from client IHS 1 202 of one or more personal credentials matching one or more entries within the received personal credential data records. The personal credential data records in an embodiment may include geographical position measurements, geographical position estimates, biometrics readings, passwords, encryption keys, and/or secret question/answers.

The broker node in an embodiment may also execute code instructions of the security credential provisioning system involving determination of an optimal node for delivery of nomadic computing resources. For example, after the broker node has successfully received personal credential data records from the client information handling system matching the personal credential data records received from the authentication server 222, the designated broker node MEC may receive a compute work request from the client information handling system such as an IoT device or thin client, seek and receive advertisement messages from MECs, access historical trust references, and determine an optimal edge compute partner to satisfy the compute work request according to embodiments herein. In another aspect, client information handling systems 202, 204, 206, and 208 may instead operate all or part of the various aspects of the security credential provisioning system when seeking edge compute resources. A client information handling system may determine needs for computing resources, issue a compute work request, and solicit advertisement messages, access historical trust references, and determine a optimal edge compute partner to satisfy the compute work request. In other embodiments, a user accessing MEC resources may have associated with the identity of the user a specified level of computing and memory resources. This specified level of computing resources and memory may be adjusted by the user or an administrator and may incur different edge compute costs in some embodiments. In an example embodiment, nomadic computing services subscribers may have a security credential provisioning system determine optimal edge compute partners based in part on cost to compute. This and other factors may be established in a trusted compute policy, which may be modified in a client information handling system through settings by a client or administrator.

Each of the client information handling systems 202, 204, 206, and 208 may wirelessly communicate with any of multiple wireless gateway devices 212, 214, 216, 218 and 220. In some cases, plural wireless links may be used. Wireless communication may be via WWAN connectivity, WLAN connectivity, WPAN connectivity or any other wireless link protocols. For example, some or all of the wireless gateway device 212, 214, 216, 218 and 220 may be LTE or WCDMA base stations operating in 2G, 2.5G, 3G, 4G, 4.5G, 5G or other 3GPP protocols with client information handling systems 202, 204, 206, and 208. Client information handling systems 202, 204, 206, and 208 may also have one or more wireless transmitters in some embodiments.

Figure 3:
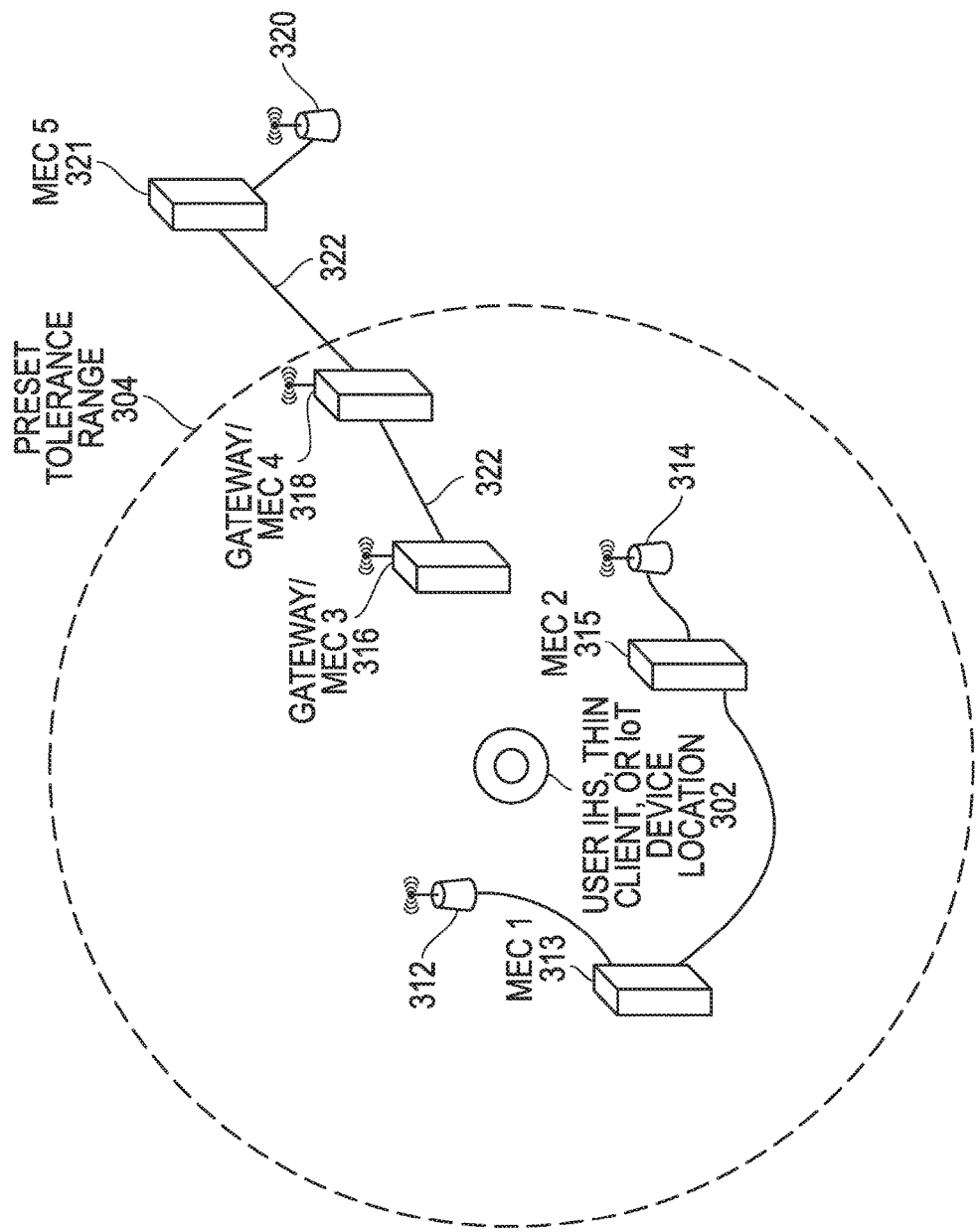
FIG. 3 is a graphical diagram illustrating a network of mobile edge-computing system devices policing access of client information handling systems to nomadic computing resources according to an embodiment of the present disclosure.

In other embodiments, some or all of the wireless gateway device 212, 214, 216, 218 and 220 may be Wi-Fi or WiGig access points for administering one or more WLAN wireless links with client information handling systems 202, 204, 206, and 208. In further embodiments, low power protocols may be used including 6LoWPAN, ZigBee, or similar WPAN protocols for interface between client information handling systems that are IoT devices 202, 204, 206, and 208 and some or all of the wireless gateway devices 212, 214, 216, 218 and 220. Wireless links may be available from wireless gateway devices 212, 214, 216, 218 and 220 via WLAN which may be connected by wireline or Ethernet connections to a wider external network such as cloud 210. For example, wireless network access points may be connected to a wireless network controller and an Ethernet switch. Wireless communications with wireless gateway devices 212, 214, 216, 218 and 220 may be via standard protocols such as IEEE 802.11 Wi-Fi, IEEE 802.11ad WiGig, IEEE 802.15 WPAN, or emerging 5G small cell WWAN communications such as eNodeB, or similar wireless network protocols. Alternatively, other available wireless links via wireless gateway devices 212, 214, 216, 218 and 220 may include macro-cellular connections via one or more service providers. Service provider macro-cellular connections may include 2G standards such as GSM, 2.5G standards such as GSM EDGE and GPRS, 3G standards such as W-CDMA/UMTS and CDMA 2000, 4G standards, or emerging 5G standards including WiMAX, LTE, and LTE Advanced, LTE-LAA, small cell WWAN, and the like FIG. 3 is a graphical diagram illustrating a network of mobile edge-computing system devices having different geographical locations policing access of client information handling systems to nomadic computing resources according to an embodiment of the present disclosure. In a nomadic computing services system, each subscriber to the system may have access to his or her data and applications, including client information, payment information, personal files, and bank account details through any information handling systems the subscriber may use to access the nomadic computing resources. For example, and as shown in FIG. 3, a subscribing client may be capable of accessing nomadic computing resources via one of MECs 313, 315, 316, 318, and/or 321 from client information handling systems. The security credential provisioning system may pre-place personal credential record for a user at a trusted MEC selected from MECs 313, 315, 316, 318, and/or 321 in some embodiments herein for efficient authentication and access to nomadic computing resources.

The security credential provisioning system operating across a plurality of mobile edge-computing system devices and/or gateway devices and an authentication server in an embodiment may require a client to provide proper credentials in order to access the nomadic computing services from any one of the subscribing client's information handling systems via any one of MECs 313, 315, 316, 318, and/or 321. One embodiment of such a security system may involve checking security credentials received from a client's information handling system against security credentials pre-place at a predicted location from the authentication server, and only granting access to clients providing correct credentials. For example, the security credential provisioning system in an embodiment may operate at each of MECs 313, 315, 316, 318, and/or 321and any one of these devices may compare security credential received from one of the client's information handling systems against security credentials received from the remotely connected authentication server (not shown), and only grant access to one of the client information handling systems providing correct credentials. By executing the code instructions of the security credential provisioning system at the MECs 313, 315, 316, 318, and/or 321, rather than the client information handling system, the overhead responsibilities of the client's information handling device may be lowered, keeping the client's device lightweight and slim.

However, because the client may access the nomadic computing services from anywhere in the world, via any information handling system, and because each of MECs 313, 315, 316, 318, and/or 321 may only service a preset geographical area, the client may attempt to provide the proper credentials via any of the mobile edge-computing systems in the world. In order to shift the responsibilities associated with comparing security credentials toMECs 313, 315, 316, 318, and/or 321, a solution is needed to preemptively estimate which of MECs 313, 315, 316, 318, and/or 321 the client may use to access the nomadic computing resources, and to deliver the personal authorization credential records from the authentication server to the mobile edge-computing system device in anticipation of the client's access attempt.

In an embodiment, the security credential provisioning system may provide a solution to this problem by estimating the future location of a subscribing client and transmitting that subscribing client's credentials to the one of MECs 313, 315, 316, 318, and/or 321 geographically closest to the future estimated location of the client 302. The future location may be estimated in embodiments of the present disclosure, for example, based on a recorded IP address for the locations most often used by the subscriber, or by applying a Kalman filter to previously recorded locations for the subscribing client to determine the client's most likely path of travel.

For example, in an embodiment, the authentication server (not shown) may access the block chain data records recording the client's previous location measurements, and apply a Kalman filter to those previous location measurements to determine the predicted future location 302 of the subscribing client, as shown in FIG. 3. In another embodiment, the authentication server (not shown) may access the block chain data records, identify the most commonly used IP address for the subscriber, and place the predicted future location 302 at the location of this identified most commonly used IP address. Once the predicted future location 302 of the subscribing client is estimated by the authentication server in an embodiment, the authentication server may transmit the client's personal credential data records to MEC 1 313, which may be the one of MECs 313, 315, 316, 318, and/or 321 located geographically closest to the future estimated location 302. Selection of MEC 1 313 may be made whereupon a determination of a trust level is made before pre-placement of personal authorization credential records at that MEC. For example, historical trust references may be accessed to determine a minimum level of trust for an MEC to be selected as an MEA authentication node.

Following receipt of the client's personal credential data records at MEC 1 313, a client information handling system may arrive at the estimated future location 302, and attempt to access the client's nomadic computing resources via MEC 1 313 in an embodiment. MEC 1 313 in such an embodiment may execute code instructions of the security credential provisioning system to compare personal credentials received from the client information handling system against the personal credential data records received from the authentication server. The MEC 1 313 may only grant access to the client's nomadic computing resources in an embodiment if one or more credentials received from the requesting client information handling system match the one or more entries within the personal credential data records received from the authentication server. In such a way, MEC 1 313 may be capable of quickly determining whether the requesting client is authorized to access the requested nomadic computing resources, without placing the authentication responsibilities within the client information handling system itself.

Upon granting nomadic computing resource access to a requesting client information handling system in an embodiment, the security credential provisioning system may identify a mobile edge computing system capable of delivering the requested nomadic computing resources. During operation of a security credential provisioning system according to embodiments herein, a compute work request may be received from a client information handling system. In other embodiments, the client information handling system may operate some or all of the security credential provisioning system and may generate a compute work request. In other aspects, a user may have resource requirements associated with their identity which may need to be satisfied when accessing edge compute resources. The security credential provisioning system may then utilize a communications channel to access advertisement messages from mobile edge computing systems such as MEC 1 313, MEC 2 315, MEC 3 316, MEC 4 318, of MEC 5 321. A general advertising services channel may be used and assigned a channel within a WiFi link, LTE link, or wired links 322 that may connect one or more MEC systems such as 316 and 318 or 318 and 321. The general advertising services channel may be an open channel of data to transmit advertisement messages about MEC availability and reliability. An information handling system seeking available MEC systems may access this channel with or without authentication required. In the case of authentication used, a subscriber authentication or an enterprise participant authentication may reside with the information handling system for access to this channel. Further, connectivity to any selected optimal mobile edge compute partner determined by the security credential provisioning system may be wireless through an access points, base stations, or other wireless transceivers as shown at 312, 314, 316, 318, and 320. Transceivers 316 and 318 may be combined with a MEC system according to some embodiments so that one available MEC system resides at the wireless gateway transceiver.

The requesting client information handling system located at the estimated future location 302 according to various embodiments herein may be part of an enterprise system providing edge computing resources. For example, the requesting client information handling system may be IoT devices seeking additional computing resources, may be thin clients of users within the enterprise, may be mobile information handling systems operating within the enterprise. In another aspect of the embodiments herein, the requesting client information handling system may be part of a subscriber based mobile edge computing service and may be a thin client system, a smart card or other user identification, or some other mobile information handling system. The security credential provisioning system assisting in finding mobile edge computing systems may operate via a broker hub at one or more MEC devices, may operate from the requesting client information handling system, or may operate in parts from remote servers.

Upon seeking advertisement messages relating to MEC availability within an area servicing the requesting client information handling system, the security credential provisioning system may limit the range 304 of MEC systems from which edge computing resources are sought. This range 304 is shown as a preset tolerance range 304 in FIG. 3. The range may be limited by wireless range from the client user information handling system, IoT device, or the like 302 to wireless adapters in a local area of operation. In addition, the preset tolerance range 304 may be further defined by a limitation on the number of hops 322 permitted or the distance of hops 322 to reach a candidate mobile edge computing system.

For example, the wireless range may limit available MEC systems based on diminishing wireless link QoS levels or wireless range. For example, wireless transceiver 320 may be too distant to effectively provide for wireless connectivity to MEC 5 321 or any other MEC device (not shown) linked via transceiver 320. By contrast, transceiver 312 may provide access to MEC 1 313 as well as access to MEC 2 315 via one hop 322 when MEC 1 313 and MEC 2 are networked. Likewise transceiver 314 may provide access to MEC 2 315 as well as a one hop link 322 to MEC 1 313.

Upon receipt of the advertisement messages relating to MEC availability within the wireless range of the requesting client information handling system, the security credential provisioning system may generate an available edge computing system table associating each MEC available within the wireless range with information within the advertisement messages receives from each of those MECs, as well as security and performance history addresses for each of those MECs. The security credential provisioning system in an embodiment may then use this generated available edge computing system table to identify an optimal MEC for delivery of nomadic computing resources.

Figure 4:
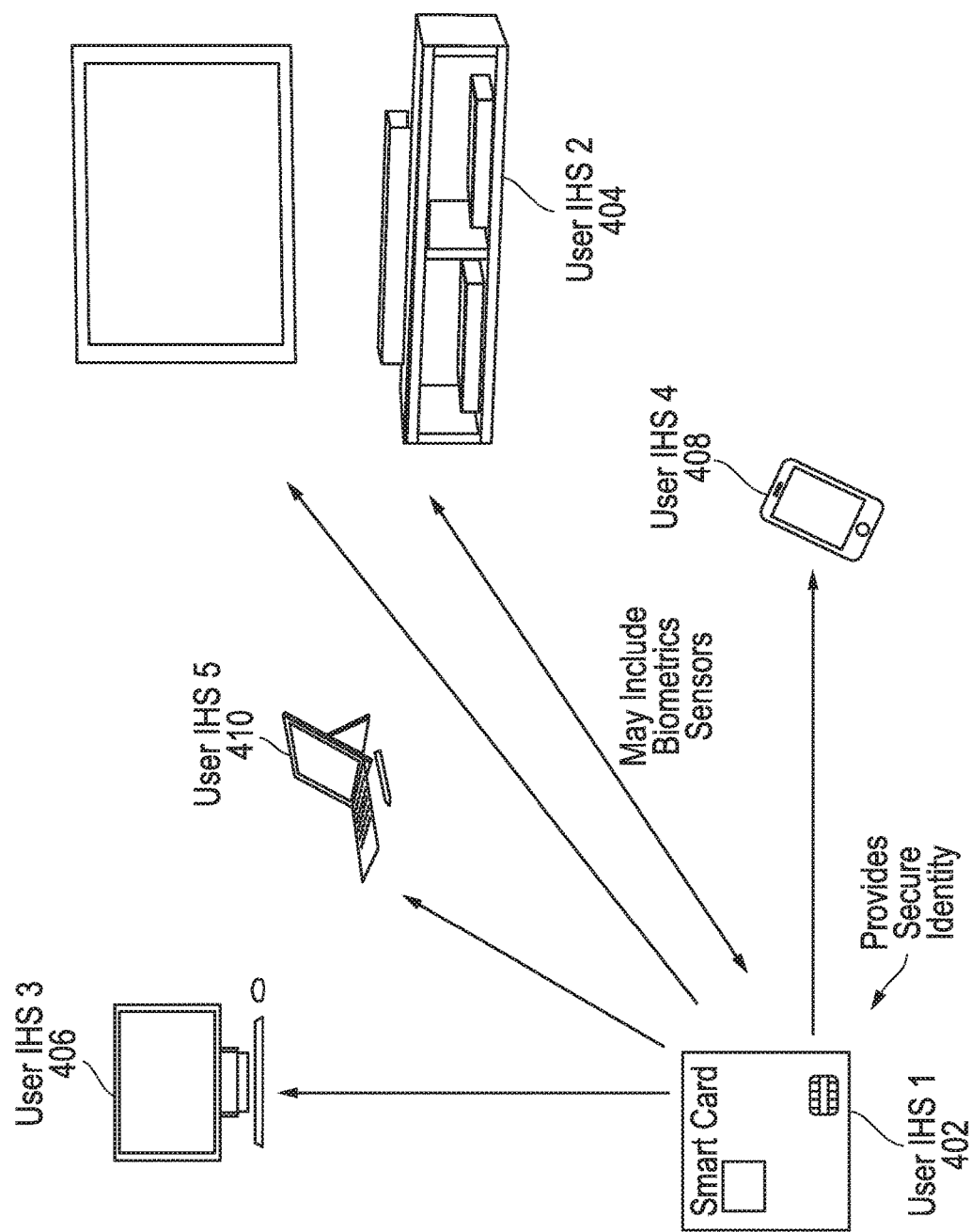
FIG. 4 is a graphical diagram illustrating client information handling systems according to an embodiment of the present disclosure.

FIG. 4 is a graphical diagram illustrating client information handling systems capable of requesting access to nomadic computing resources according to an embodiment of the present disclosure. Subscribers to a nomadic computing services system in an embodiment may be capable of accessing computing services associated with that subscriber at any client information handling system, including information handling system 1 402, information handling system 2 404, information handling system 3 406, information handling system 4 408, and/or information handling system 5 210. The subscriber's sensitive private data in an embodiment may be stored at a cloud computing resource within the cloud, but may be accessed at any of the subscribing client's information handling systems, including IHSs 1-5 402-410, using the nomadic computing services system. The plurality of client information handling systems 402-410, as shown in FIG. 4, may belong to a single subscribing client. Client information handling systems 402, 404, 406, 408, and 410 may be an IoT device, a thin client information handling system, a smartcard, a mobile information handling system, or any other information handling system with wireless access and seeking mobile edge computing resources. For example, in an embodiment, the client IHS 1 402 may be a thin client IHS (e.g. smartcard), client IHS 2 404 may be a wall-mounted computing display, client IHS 3 406 may be a desktop computer, client IHS 4 408 may be a mobile smart phone, and client IHS 4 410 may be a portable laptop or tablet computer. Each of the plurality of subscribing client information handling systems 402-410 may be located in the same or different geographical areas.

Each of the client information handling systems 402-410 may also include GPS location circuits, and/or a plurality of biometric sensing systems. For example, and as shown in FIG. 4, the client IHS 1 402 may be a smartcard, and the client IHS 2 404 may be a wall-mounted computing device. In an example embodiment, each of the smartcard IHS 1 402 and the wall-mounted computing device IHS 2 404 may include a voice ID system, a visual ID system, a hand ID system, and other biometric identification systems known in the art. An example voice ID system in an embodiment may include one or more microphones, and may be capable of identifying the client's voice by comparing a recorded voice with a voice recording of a known subscribing client, or via other recognition technologies known in the art. An example visual ID system in an embodiment may include one or more cameras, and may be capable of identifying the client captured in images taken by the one or more cameras by matching the images with known subscribing client retinal scans, facial recognition records, heat signature recognition records, client gesture signature records, or other known visual recognition technologies known in the art. An example hand ID system in an embodiment may include one or more cameras or touchpads, and may be capable of identifying the client by matching camera images or touchpad measurements with known subscribing client thumb scans, finger scans, palm scans, or other known fingerprint recognition technologies known in the art.

In an embodiment, an information handling system that includes one or more of the voice ID system, visual ID system, and/or hand ID system may identify the client as the client enters the nearby vicinity of that information handling system. The client information handling system in some embodiments may identify the client upon request from the client to access the nomadic computing resources. For example, as shown in FIG. 4, client IHS 1 402 in an embodiment may detect the presence of the client holding the smartcard client IHS 1 402 via a thumbprint, retinal scan, voice identification, palm scan, location fingerprint system, and/or a voice recognition command. The client information handling system in other embodiments may identify the client passively, without requiring the client to make a direct request to access the nomadic computing resources. As another example, and as also shown in FIG. 4, client IHS 2 404 in an embodiment may detect the presence of the client within the nearby vicinity of the wall-mounted computing display client IHS 2 404 via detection and identification of the client's voice, detection of a human heat signature, detection of a human gesture, facial recognition scan, or detection and identification of the client's gestures or movement, without the client actively attempting to register his presence with client IHS 2 404. This detection may then be compare with the pre-located personal authorization credential record at a trusted authentication partner node MEA system.

Upon recording biometric information positively identifying the client in an embodiment, the information handling system that performed the biometric measurements may transmit the biometric information positively identifying the client to a second information handling system associated with the subscribing client, or directly to a mobile edge-computing system. For example, in an embodiment, the client IHS 2 404 may transmit the passively recorded biometric reading or biometric information to the client IHS 1 402. The client IHS 1 402 may then transmit the received biometric information to a mobile edge-computing service in an attempt to access nomadic computing resources via the mobile edge-computing system. In other embodiments (not shown), the IHS 2 404 may transmit the biometric readings directly to the mobile edge-computing system, rather than transmitting the biometric readings to client IHS 1 402 for a later log in attempt.

In an embodiment in which a mobile edge-computing system confirms the biometric readings received from client IHS 1 402 match biometric readings stored in the pre-located personal authorization credential records data record it received from the authentication server, the mobile edge-computing system may grant access to the client IHS 1 402 which requested access. In an alternate embodiment, in which the mobile edge-computing system confirms the biometric readings received from client IHS 1 402 match biometric readings stored in the personal authorization credential records data record it received from the authentication server, the mobile edge-computing system may grant access to a plurality of information handling systems associated with the subscribing client operating within the service area of the mobile edge-computing system (e.g. client IHS 1 402, client IHS 2 404, client IHS 3 406, client IHS 4 408, and client IHS 5 410).

FIG. 5 is a graphic diagram illustrating a block chain of subscriber location fingerprints and links to personal authorization credential records according to an embodiment of the present disclosure. A block chain is a distributed database of time-stamped records called "blocks." A block chain grows by adding a plurality of blocks, where each block is linked to the other blocks to form a chain. Each block in a block chain may be added by a different entity or device simply by linking a new block to previously recorded blocks. Because each block links to a previous block, and all blocks may be generated by differing devices, an early block within a block chain cannot be altered retroactively without altering all of the subsequent blocks that later followed and linked to that early block. This makes block chains inherently resistant to modification of each time-stamped record within the chain. A block chain based recording system may make transmission and authentication of data between a plurality of devices quicker, cheaper, and safer than traditional non-distributed systems with a central authentication server that may be hacked.

As shown in FIG. 5, a block chain of subscriber location fingerprints 502 may include one or more subscriber location fingerprints 504, and 506. Each subscriber location fingerprint may include a timestamp indicating the time of estimation or measurement of the location of a subscriber, an estimated or measured position of the subscriber, an estimated or measured velocity of the subscriber, an estimated or measured acceleration of the subscriber, a most popular location for that subscriber, a confidence interval for the estimation of the subscriber's position, velocity, and acceleration, where relevant, and a link to a personal authorization credential record. Each block chain of subscriber location fingerprints 502 in an embodiment may be associated with only a single subscriber. Groups of subscribers may be associated with a single block chain in other embodiments.

The security credential provisioning system in an embodiment may access a previously received and stored state variable for a mobile information handling system previously verified as being in use by the subscriber, indicating the last known position for the subscriber, and may use this last known position to estimate where the client will be in the future. For example, as shown in FIG. 5, the block chain of subscriber location fingerprints 502 in an embodiment may include a subscriber location fingerprint 504 measuring the location of the subscriber at GPS coordinates 40.73324, and −73.98 degrees, travelling with a velocity of 3 km/h, and an estimated acceleration of 0 km/h$^2$ at a time of 16:30:27 GMT on Jun. 1, 2017. This type of measurement may occur when, for example, the subscriber is walking from her home to her office. The security credential provisioning system may estimate the likely position of the subscriber at a later time based upon these state values. The block chain of subscriber location fingerprints 502 may also include a most popular location of 40.698, and −74.32 degrees that may represent the location of her office.

As shown in FIG. 5, the block chain of subscriber location fingerprints 502 in an embodiment may include a subscriber location fingerprint 506 indicating that the security credential provisioning system has estimated that subscriber had an estimated position of 40.698, and −74.32 degrees, an estimated velocity of 0 km/h, and an estimated acceleration of 0 km/h$^2$ at an estimation time of 16:35:18 GMT on Jun. 1, 2017. The estimated position (located at her office) may be determined based upon the velocity, acceleration, and direction in which the mobile information handling system was travelling at the measurement time of 16:30:27 described directly above, and/or upon the description of her office location as the most popular location. In estimating a subscriber's current state in an embodiment, the security credential provisioning system operating in part at an authentication server may use a linear-quadratic estimation to produce estimates of current state variables based upon previously measured state variables, including an estimated position, estimated velocity, and estimated acceleration. More specifically, the security credential provisioning system may use a Kalman filter to perform this estimation.

Each block in the block chain of subscriber location fingerprints 502 in an embodiment may further contain a link to separate data records, including a personal authorization credential record associated with the subscribing client. As described in greater detail below, the personal authorization credential record may be stored at the authentication server operating the security credential provisioning system in an embodiment, and may include the security credentials associated with a single subscribing client whose position is also described in the block chain of subscriber location fingerprints 502.

FIG. 6 is a graphic diagram illustrating a personal authorization credential record including biometric identification information according to an embodiment of the present disclosure. A personal authorization credential record 602 in an embodiment may be stored at the authentication server operating the security credential provisioning system in an embodiment. As shown in FIG. 6, a personal authorization credential record 602 in an embodiment may include several types of personal authorization credential records, and a personal authorization credential record value associated with each type of personal authorization credential record.

For example, as shown in row 604, the personal authorization credential record 602 in an embodiment may include a client name personal authorization credential record having a value of "client 1." As another example, as shown in row 606, the personal authorization credential record 602 in an embodiment may include a password personal authorization credential record having a value of "PASS." As another example, as shown in row 608, the personal authorization credential record 602 in an embodiment may include a private key personal authorization credential record having a value that includes a long-string alpha-numeric value. As another example, as shown in row 610, the personal authorization credential record 602 in an embodiment may include a visual ID signature personal authorization credential record having a value that links to a visual recognition system data record (e.g. facial recognition data record, retinal scan data record, movement detection data record, etc.). As another example, as shown in row 612, the personal authorization credential record 602 in an embodiment may include a voice ID signature personal authorization credential record having a value that links to a voice recognition system data record. As another example, as shown in row 614, the personal authorization credential record 602 in an embodiment may include a hand ID signature personal authorization credential record having a value that links to a hand ID recognition system data record (e.g. thumbprint scan, palm print scan). As another example, as shown in row 616, the personal authorization credential record 602 in an embodiment may include a location ID signature personal authorization credential record having a value that links to the most recent time-stamped block in a location fingerprint block chain associated with the subscribing client. As another example, as shown in row 618, the personal authorization credential record 602 in an embodiment may include a secret question personal authorization credential record having a value of "what was the name of your first pet?" As another example, as shown in row 620, the personal authorization credential record 602 in an embodiment may include a secret answer personal authorization credential record having a value of "Scooby." As yet another example, as shown in row 622, the personal authorization credential record 602 in an embodiment may include an allow location prediction personal authorization credential record having a value of "Yes."

FIG. 7 is a graphic diagram illustrating a collection of advertisement messages for a list of mobile edge computing systems or mobile edge authentication systems according to an embodiment of the present disclosure. Table 700 includes a list of mobile edge computing systems and related advertisement messages received by a security credential provisioning system. The advertisement messages may be solicited by the security credential provisioning system on behalf of the client information handling system in response to a request for edge computing resources. In other instances, the advertisement messages may be broadcast by available edge computing systems and accessed by a security credential provisioning system via a general advertising services channel made available for such a purpose. In yet other instances, the advertisement messages may be solicited by the security credential provisioning system in anticipation of a request for edge computing resources at an estimated future location.

In an example embodiment, the table 700 represents a list of available MEC systems within an area of the requesting client information handling system. Those systems not available at a particular time or outside a preset tolerance range may not appear in a list of available MEC systems. Thus, systems listed in table 700 may be considered candidate MEC systems that are being rated or otherwise assessed by the security credential provisioning system of the present embodiments. In a first embodiment, an advertisement message 704 may be received by the security credential provisioning system for "Cyber café 1". The advertisement message may include the name of the MEC system, an internet address, a providing company or organization, radio technology by which the system may be accessed, and an encrypted security and performance history address. In a separate transmission, an encryption key may be provided for "Cyber café 1" to access a set of historical trust references that may be located at the security and performance history address. In an example embodiment, the historical trust references may be stored at the security and performance history address within a block chain for protection of the data. The radio technology by which the MEC system "Cyber café 1" may be accessed may include co-located transceiver or nearby transceiver systems that service "Cyber café 1". In this example, WiFi, WiGig, and LTE Unlicensed transceiver options may be available.

In a further aspect, the MEC system advertisement messages may include currently available computing resources as shown in columns 714 including core CPU units available and memory available. These compute capability aspects 714 are considered in determining the optimal edge compute partner or partners and optimal edge authenticate partner or partners by the security credential provisioning system according to embodiments herein.

In other example embodiment, advertisement message 706 may be provided for a MEC system called "Carrier cloud services 1". It is noted that "Carrier cloud services 1" has fewer available CPU core units available and less memory available than "Cyber café 1". Advertisement message 708 is shown for MEC system "Cloud services 2". Advertisement message 710 is shown for MEC system "Cyber café 2". Advertisement message 712 is shown for MEC system "Web services 2".

As can seen from the listed advertisement messages for the available MEC systems in an area of a requesting client information handling system, varied levels of computing resources may be available. Further, access may be limited to particular wireless protocol types. In several embodiments described herein, a mobile security credential provisioning system may determine the encoded security and performance history address location by decoding the encoded secure address information from the advertisement message (for example, Base 58 with check encode payload). Then the security credential provisioning system may access the relevant security and performance history address locations to obtain, and in some embodiments decrypt, the historical trust references stored there for each of the MEC systems considered to be candidates for local compute partnership or local authenticate partnership. The historical trust references may be encrypted and subsequently decrypted according to a variety of encryption techniques including symmetric or asymmetric encryption.

In one example embodiment, the historical trust references may be stored in a block chain at the security and performance history address locations, or at the authentication server for security reasons. In a particular embodiment, the block chain is a distributed database of time-stamped records called "blocks." A block chain may grow by adding a plurality of blocks, where each block is linked to the other blocks to form a chain. In some aspects the number of blocks may be limited such that at some point a first block is eliminated with a new block added. Each block in a block chain may be added by a different entity or device simply by linking a new block to previously recorded blocks. Because each block links to a previous block, and all blocks may be generated by differing devices, and an early block within a block chain cannot be altered retroactively without altering all of the subsequent blocks that later followed and linked to that early block. This makes block chains inherently resistant to modification of each time-stamped record within the chain. Data miners may be utilized to encrypt the blocks of a block chain to provide algorithmic encryption of data contained therein. This algorithmic encryption of the block chaining may be computationally intensive. Accordingly, block chaining miners may in some aspects be compensated for creating the block chained data. A block chain based recording system may make recording and transmitting historical trust references for a plurality of MEC systems quicker, cheaper, and safer than traditional non-distributed systems with a central authentication server or encryption method that may be hacked.

Figure 8:
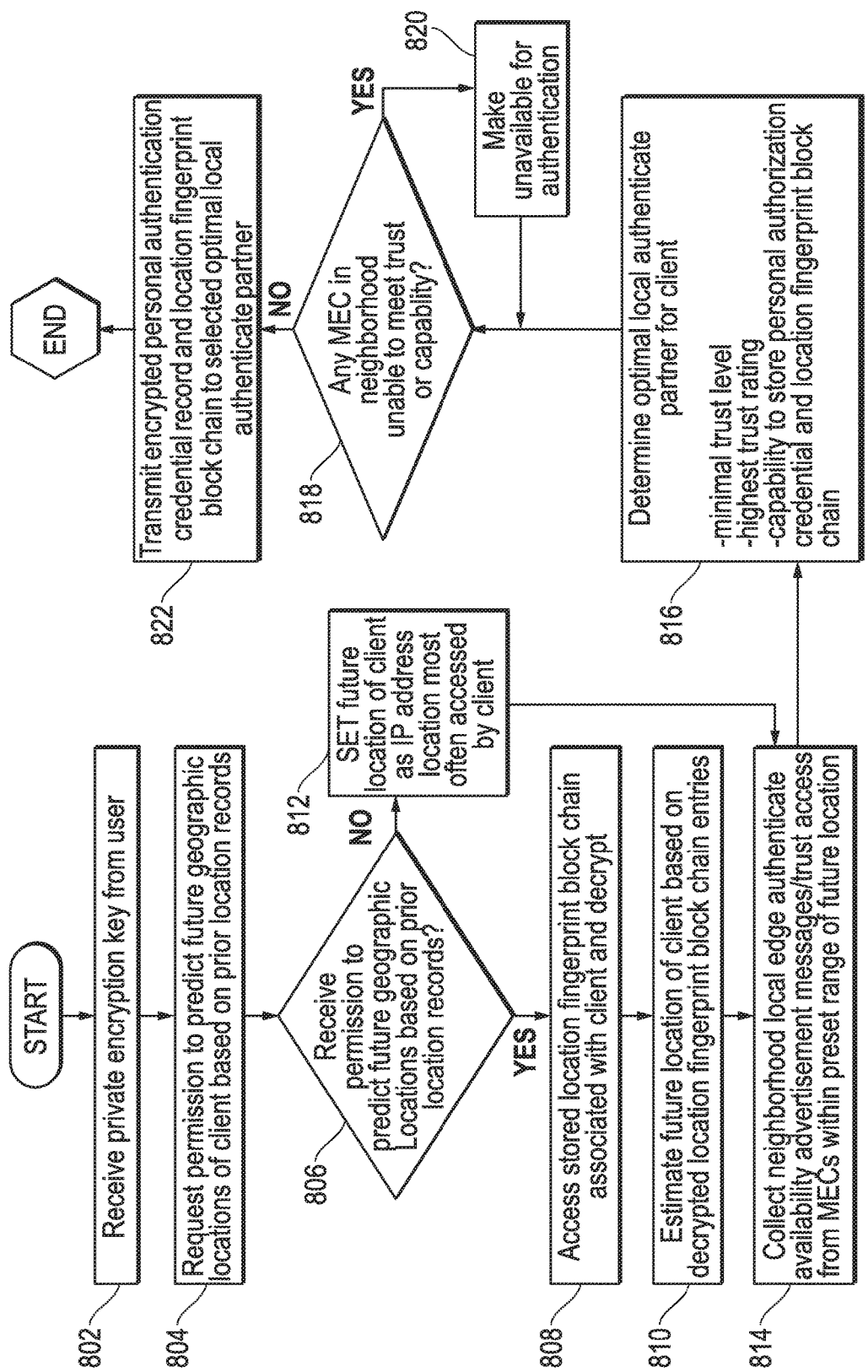
FIG. 8 is a flow diagram illustrating a method of provisioning client security credentials at an optimal local edge authentication system according to an embodiment of the present disclosure.

FIG. 8 is a flow diagram illustrating a method of provisioning client security credentials at a mobile edge-computing system servicing an estimated future client location in anticipation of the client attempting to access nomadic computing resources at the estimated location in the future according to an embodiment of the present disclosure. The security credential provisioning system operating across a plurality of mobile edge-computing system devices and an authentication server in an embodiment may require a client to provide proper credentials in order to access the nomadic computing services from any one of the subscribing client's information handling systems via any one of a plurality of mobile edge-computing system devices. One embodiment of such a security system may involve checking security credentials received from a client's information handling system against security credentials pre-located at a predicted future location by the authentication server, and only granting access to clients providing correct credentials, as described in greater detail below. By executing the code instructions of the security credential provisioning system at the mobile edge-computing system device, rather than the client information handling system, the overhead responsibilities of the client's information handling device may be lowered, keeping the client's device lightweight and slim.

However, because the client may access the nomadic computing services from anywhere in the world, via any information handling system, and because each mobile edge-computing system device may only service a preset geographical area, the client may attempt to provide the proper credentials via any of the mobile edge-computing systems in the world. In order to shift the responsibilities associated with comparing security credentials to the mobile-edge computing system device, a solution is needed to preemptively estimate which mobile edge-computing system device the client may use to access the nomadic computing resources, and to deliver the personal authorization credential records from the authentication server to the mobile edge-computing system device in anticipation of the client's access attempt. In an embodiment, the security credential provisioning system may provide a solution to this problem by estimating the future location of a subscribing client and transmitting that subscribing client's credentials to a trusted mobile edge-computing system device servicing the area surrounding the estimated future location serving as a selected optimal local authentication partner or an MEA.

As shown in FIG. 8, at block 802, the security credential provisioning system operating at an authentication server may receive a private encryption key from a subscribing client. The security credential provisioning system may have earlier provided this encryption key to the client upon initialization of the client's subscription, and the security credential provisioning system may use this private encryption key for the purposes of decrypting data records stored at the authentication server and associated with the subscribing client.

At block 804, in an embodiment, the security credential provisioning system operating at the authentication server may request permission to predict the future geographic locations of the client based on prior location records. As described above, a block chain of subscriber location fingerprints for a subscribing client may be stored at the authentication server, and may include a timestamp indicating the time of estimation or measurement of the location of a subscriber, an estimated or measured position of the subscriber, an estimated or measured velocity of the subscriber, an estimated or measured acceleration of the subscriber, and a most popular location for that subscriber. As described in greater detail below, the security credential provisioning system in an embodiment may be capable of predicting future geographic locations of the subscribing client based upon the previous location, velocity, and accelerations measurements of the client, as stored in the client's block chain of subscriber location fingerprints.

At block 806, in an embodiment, the security credential provisioning system operating at the authentication server may determine whether permission to predict the future geographic locations of the client based on prior location records has been received. A client may wish to allow the security credential provisioning system operating at the authentication server to estimate the subscriber's future position in order to allow the security credential provisioning system to automate provisioning of security credentials for the subscribing client at a mobile edge-computing system nearby the estimated future location. The mobile edge-computing system in such a scenario may receive the security credentials (which are a necessary tool in granting subscriber's access to nomadic computing resources) ahead of the client's arrival at the future location, in anticipation of the client attempting to access nomadic computing resources via that mobile edge-computing system. In other words, automating the delivery of the client's security credentials at the proper mobile edge-computing system in embodiments may speed up the process of logging the client in to the nomadic computing resources via that mobile edge-computing system.

In other embodiments, the client may not wish to allow the security credential provisioning system operating at the authentication server to predict future geographic locations based on prior location records. For example, if the client is often travelling at high speed, or travelling between locations not routinely visited, the location estimations provided by the security credential provisioning system operating at the authentication server may be less accurate, and the client may wish not to enable this functionality. In other embodiments, the client may not wish to enable this functionality for security or privacy purposes.

If the security credential provisioning system operating at the authentication server determines it has received permission to predict future geographic locations based on prior location records, the method may proceed to block 808. If the security credential provisioning system operating at the authentication server determines it has not received permission to predict future geographic locations based on prior location records, the method may proceed to block 812.

At block 808, in an embodiment, if the security credential provisioning system operating at the authentication server has determined it has received permission to predict future geographic locations of the client based on prior location records, it may access stored location fingerprint block chains associated with the client and decrypt the block chains. As described herein, a block chain of subscriber location fingerprints for a subscribing client may be stored at the authentication server, and may include a timestamp indicating the time of estimation or measurement of the location of a subscriber, an estimated or measured position of the subscriber, an estimated or measured velocity of the subscriber, an estimated or measured acceleration of the subscriber, and a most popular location for that subscriber. Each subscriber's block chain in an embodiment may or may not be encrypted, as stored at the authentication server.

As also described above with respect to block 802, the security credential provisioning system operating at the authentication server may have received a private encryption key that can be used to decrypt the block chain of the subscriber location fingerprints via any known encryption method, including but not limited to asymmetric encryption methods.

At block 810, in an embodiment, the security credential provisioning system operating at the authentication server may estimate the future location of the client based on the decrypted location fingerprint block chain entries. As described above, the security credential provisioning system in an embodiment may access a previously received and stored state variable for a mobile information handling system previously verified as being in use by the subscriber, indicating the last known position for the subscriber, and may use this last known position to estimate where the client will be in the future. For example, the block chain of subscriber location fingerprints in an embodiment may include a subscriber location fingerprint measuring the location of the subscriber at GPS coordinates 40.73324, and −73.98 degrees, travelling with a velocity of 3 km/h, and an estimated acceleration of 0 km/h$^2$ at a time of 16:30:27 GMT on Jun. 1, 2017. The security credential provisioning system may estimate the likely position 40.698, and −74.32 degrees of the subscriber at a later time of 16:35:18 GMT on Jun. 1, 2017 based upon these state values. The estimated position (located at her office) may be determined based on the block entry indicating the state variables of the mobile information handling system at the measurement time of 16:30:27 using a linear-quadratic estimation to produce estimates of current state variables based upon previously measured state variables, including an estimated position, estimated velocity, and estimated acceleration. More specifically, the security credential provisioning system may use a Kalman filter to perform this estimation.

At block 812, in an embodiment, if the security credential provisioning system operating at the authentication server has determined it has not received permission to predict future geographic locations of the client based on prior location records, it may set the future location of the client as the IP address of the location most often accessed by the client. As described above, a block chain of subscriber location fingerprints for a subscribing client may be stored at the authentication server, and may include a timestamp indicating the time of estimation or measurement of the location of a subscriber, an estimated or measured position of the subscriber, an estimated or measured velocity of the subscriber, an estimated or measured acceleration of the subscriber, and a most popular location for that subscriber. The security credential provisioning system operating at the authentication server in an embodiment may access the block chain entries associated with the subscribing client, and rather than estimating a future position of the client, may set the client's future location at the client's most popular location, as stored in the client's block chain location fingerprint. For example, the block chain of subscriber location fingerprints may include a most popular location of 40.698, and −74.32 degrees that may represent the location of her office. The future position (located at her office) may be set based upon the description of her office location as the most popular location.

At block 814, in an embodiment, the security credential provisioning system may collect neighborhood local edge authenticate availability advertisement messages and/or trust access information from mobile edge-compute systems within a preset range of the future location. As described above, in a nomadic computing services system, each subscriber to the system may have access to his or her data and applications, including client information, payment information, personal files, and bank account details through any information handling systems (IHS) the subscriber may use to access the nomadic computing resources. Further, each client in an embodiment may be capable of accessing nomadic computing resources via one of a plurality of mobile edge-computing systems (MEC). In an example embodiment, a subscribing client may be capable of accessing nomadic computing resources via one of the mobile edge-computing systems MEC 1, MEC 2, MEC 3, MEC 4, MEC 5, and/or MEC 6 from client IHS 1, client IHS 2, client IHS 3, and/or client IHS 4. In an example embodiment, the security credential provisioning system operating at the authentication server may identify mobile edge-computing systems MEC 1, MEC 2, MEC 3, MEC 4, and MEC 5, but not MEC 6 are located within a preset radius from the estimated future location at the client's office, as estimated or set at block 810 or block 812, above.

The preset tolerance radius in an embodiment may vary widely depending on the typical range of the mobile edge-computing system devices used (e.g. WLAN base station, LTE base station) and may include, but not be limited to a range to a user client information handling system and a limited number of hops. In other embodiments, the preset tolerance radius values may be one meter, one hundred meters, one kilometer, five kilometers, and/or thirty-five kilometers. The value of the preset tolerance radius in an embodiment may exceed thirty-five kilometers as new wireless standards evolve to include base stations having a range greater than thirty-five kilometers.

Once the security credential provisioning system has identified a plurality of MECs within the preset range of the future location, it may determine a local channel that is available or designated for exchange of edge compute advertising services. The local channel may be a networked channel or a WLAN channel designated for communicating with MEC systems or corresponding access points or base stations to request advertisement messages detailing the availability, capability and trustworthiness of one or more MEC systems that may provide resources for the authentication of a client requesting access to nomadic computing resources. In another embodiment, the MEC systems may each broadcast advertisement messages with encoded or encrypted information for accessing the historical trust references on that MEC system on a generic advertising services link. The security credential provisioning system may access the MEC system advertisements which are updated as to availability and current resources available periodically or continuously.

Through the edge compute advertising service, advertisement messages may be collected at 814 from available MEC systems within a preset tolerance range of the position of the client information handling system. The advertisement messages may include identifying information for the MEC system, details on available resources at an MEC system, and links to historical trust references as well as a key for decrypting historical trust reference information.

At block 816, in an embodiment, the security credential provisioning system may determine an optimal local authenticate partner for the client from a list of candidate local mobile edge authenticate systems. The security credential provisioning system in an embodiment may use the collected neighborhood local edge compute availability advertisement messages to establish a list of candidate local mobile edge authenticate (MEA) systems from the plurality of MECs. Systems that are unavailable may not provide advertisement messages or the advertisement messages may indicate unavailability. These local MEC systems will not be listed in the candidate local MEA systems. Further, some parameters may eliminate other MEC systems advertising available local compute services including types of wireless connectivity to access the MEC system which may or may not be compatible with the requesting client information handling system. Other parameters to limit the list of candidate MEA systems may be limitations on reported QoS levels or reported data error rates in wireless communication with a wireless transceiver associated with accessing a MEC system.

Once a list of candidate local MEA systems is established, the security credential provisioning system may decode and access secure locations for historical trust references for each candidate MEA system. Once decrypted, the historical trust references include a report of a series of previous compute experiences with respect to the candidate MEA system. This may include ability to complete authentication processes, ability to complete compute work requests, time of completion of an assigned task, time of completion of an authentication process, reported errors, reported communication difficulties, incidents with security, billing issues, and other reportable aspects of the information handling system. Each block in an example embodiment may include reported data for an episode of compute services or an episode of authentication processing provided by the candidate MEA system.

The security credential provisioning system may evaluate the historical trust references for each candidate MEA system, and flag any instances of failure to complete compute work requests, failure to complete authentication processes, any reported incidents of security breaches or introduction of malware, any reported errors or time out episodes, reported payment problems or fraud, or other significant problems identifiable with the provision of the edge compute services. In one example embodiment, one or more instances of the above type events may place the candidate MEA system in an untrustworthy category. No reported events such as the above may place the candidate MEA system in a trustworthy category. In another embodiment, the security credential provisioning system may create a trustworthiness rating from the historical trust references records for each candidate MEA for comparison through application of any algorithm to assess performance of the candidate MEA system.

Upon determination of the trustworthiness categorization or trustworthiness algorithmic rating, the security credential provisioning system may determine an optimal edge authenticate partner for the client, in anticipation of future access attempts at the future location. In one example embodiment, one or more optimal edge compute partners may be recommended for the candidate MEA systems that meet a minimum trust level such as a threshold trustworthiness categorization or a minimum threshold trustworthiness rating. In another embodiment, the security credential provisioning system may select one or more optimal edge compute partner based on those candidate MEA systems that have the highest trustworthiness category or trustworthiness rating. Additional aspects may be considered by the mobile security credential provisioning system at this time if not already considered in the weighting calculation of a trustworthiness score value. For example, further narrowing of MEA systems that may qualify as an optimal edge authenticate partner may be made according to each MEA system's access to sufficient storage space to store a personal authorization credential record and location fingerprint block chain of the client.

At block 818, if the mobile security credential provisioning system in an embodiment detects that any candidate MEA system has current processing or memory resources insufficient to match those required by the client authentication process, then flow may proceed to 820. Similarly, if any candidate MEA system is determined to not meet a minimal trustworthiness level, flow may proceed to 820. At 820, the security credential provisioning system will make the candidate MEA system unavailable for authentication of the client. A highly untrustworthy candidate MEA system may be barred from utilization to protect the client information handling system.

In some embodiments, it is understood that the available processing and memory resources at candidate MEA systems may change dynamically. Thus, the availability of a candidate MEA system may change as resource availability for processing and memory change. It is understood that in some embodiments, the current inability of a MEA system providing an advertisement message of availability to meet the specific requirements of the compute work request may be a basis of elimination from the list of candidate MEA system in the first place. In other embodiments, the dynamic nature of processing and memory resource availability may involve ongoing reporting of those resources by each candidate MEA system. The security credential provisioning system may monitor the processing and memory capacity of the candidate MEA system reporting their availability. Flow returns to 818 to determine if any additional candidate MEA systems are unable to meet a minimum trust level or have insufficient capacity. If no further candidate MEA systems are reporting poor trustworthiness or insufficient capacity, then flow may proceed to 822.

At block 822, the security credential provisioning system in an embodiment may transmit an encrypted personal authorization credential record and location fingerprint block chain to the selected optimal local authenticate partner. The encrypted personal authorization credential record and location fingerprint block chain may be stored at the selected optimal local authenticate partner in anticipation of the client attempting at a later time to authenticate itself as an authorized subscribing client in order to access the client's nomadic computing resources. The security credential provisioning system in an embodiment may use the received and stored encrypted personal authorization credential record and location fingerprint block chain to complete the process of authenticating a requesting client, as described in greater detail below.

Figure 9:
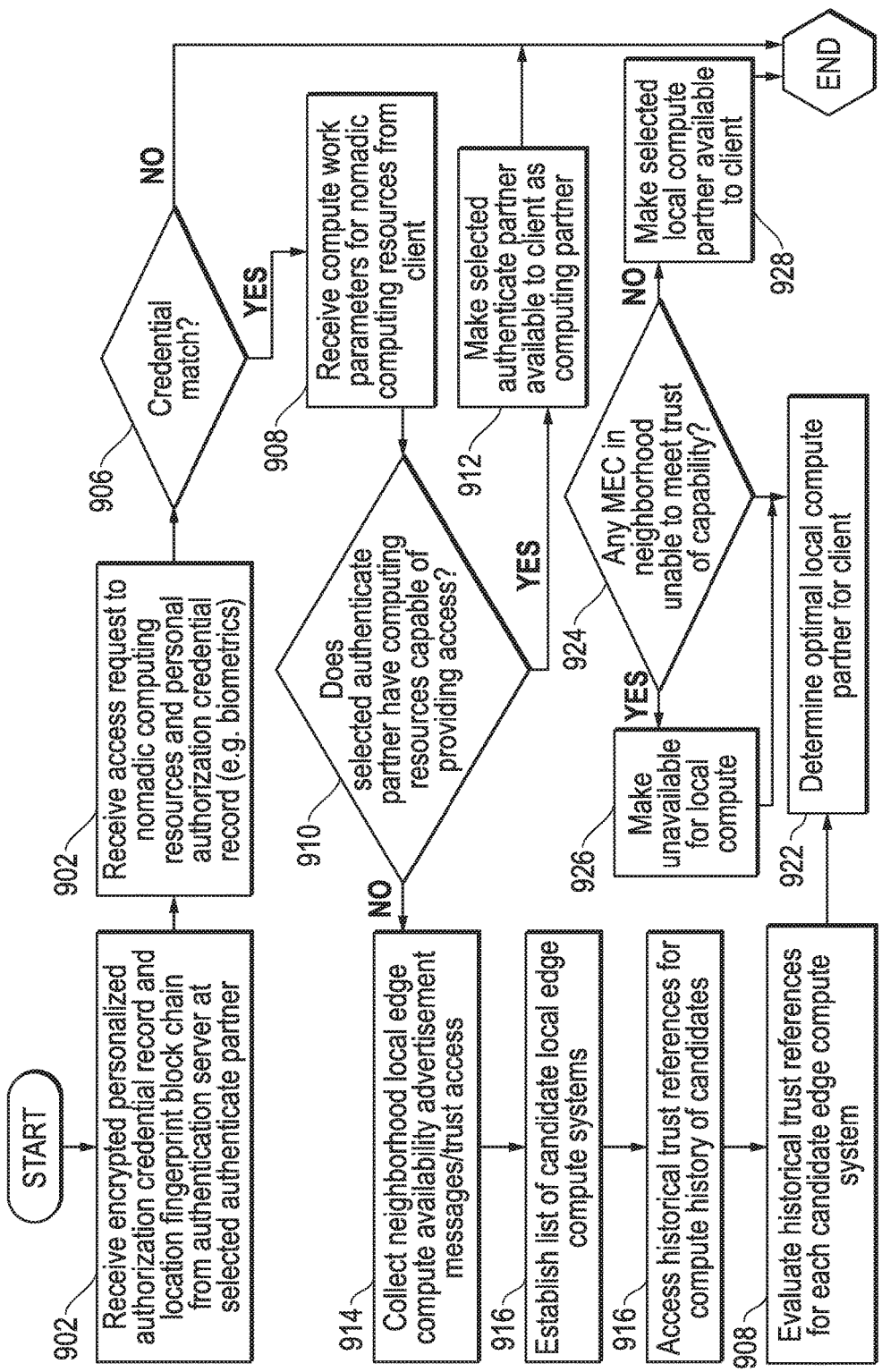
FIG. 9 is a flow diagram illustrating a method of delivering requested nomadic computing resources to a client according to an embodiment of the present disclosure.

FIG. 9 is a flow diagram illustrating a method of provisioning client security credentials at an estimated future local mobile edge authentication system having access to the computing resources necessary to authenticate a client according to an embodiment of the present disclosure. As described directly above, the security credential provisioning system operating at an authentication server in an embodiment may transmit an encrypted personal authorization credential record and location fingerprint block chain to a selected optimal local authenticate partner at an estimated location. At block 902, the security credential provisioning system operating at the selected optimal local authenticate partner (a mobile edge-compute system), may receive and store the encrypted personalized authorization credential record and location fingerprint block chain. This may occur in anticipation of the client attempting at a later time to authenticate itself as an authorized subscribing client in order to access the client's nomadic computing resources.

At block 904, in an embodiment, the security credential provisioning system operating at the optimal local authenticate partner may receive an access request to nomadic computing resources, and one or more personal authorization credential records. Upon arrival of the client at the future location estimated or set by the authentication server, in an embodiment, the client may proceed to request access to nomadic computing resources, as anticipated. In doing so, the client may transmit to the optimal local authenticate partner one or more personal authorization credential records (e.g. biometric readings, username, password, encryption key, secret question/answers) in order to authenticate the requesting client as an authorized user of the nomadic computing resources.

At block 906, in an embodiment, the security credential provisioning system may determine whether the personal authorization credential record received from the requesting client matches the personal authorization credential record pre-located from the authentication server and stored at the optimal local authenticate partner. As described in greater detail below, the security credential provisioning system may only allow access to a requesting client that can identify itself as an authorized user of the nomadic computing resources. If the personal authorization credential record received from the requesting client matches the personal authorization credential record received from the authentication server and stored at the optimal local authenticate partner in an embodiment, the flow may proceed to block 908. If the personal authorization credential record received from the requesting client does not match the personal authorization credential record pre-located from the authentication server and stored at the optimal local authenticate partner, in an embodiment, the flow may end.

At block 910, in an embodiment it may be determined whether the selected optimal local authenticate partner has the computing resources capable of providing the requested access. In an embodiment, even if the selected optimal local authenticate partner is capable of authenticating a client by comparing credentials received from the client against credentials received from the authenticating server, the selected optimal local authenticate partner may not have access to the computing resources needed to provide access to the client's nomadic computing resources, which may require more resources than the authentication process. The computing resources needed may include memory storage space for data records received from either the subscribing client's information handling system or from the remote server where the nomadic computing resources are maintained. The computing resources needed may also include processing power necessary to process requests for data and services from the remote nomadic computing resources, and bandwidth needed to receive data and services from the remote nomadic computing resources or to transmit received data and services to the client's information handling system. If it is determined the selected optimal local authenticate partner in an embodiment has access to the computing resources necessary to provide the requested access to the nomadic computing resources, the flow may proceed to block 912. If it is determined the selected optimal local authenticate partner in an embodiment does not have access to the computing resources necessary to provide the requested access to the nomadic computing resources, the flow may proceed to block 914.

At block 912, in an embodiment, the security credential provisioning system may make the selected optimal local authenticate partner available to the client as the local computing partner. A commitment to work may be obtained from the local authenticate system that will serve as the optimal edge compute partner. Further, the client information handling system may be provided the IP address, corresponding wireless link, and the commitment to work for the local authenticate partner. At this point the method of operation of the security credential provisioning system may end.

At block 914, in an embodiment, the security credential provisioning system operating at the optimal local authenticate partner may collect neighborhood local edge compute availability advertisement messages and/or trust access. Through the edge compute advertising service, advertisement messages may be collected from available MEC systems within a preset tolerance range of the position of the client information handling system. The advertisement messages may include identifying information for the MEC system, details on available resources at an MEC system, and links to historical trust references as well as a key for decrypting historical trust reference information. Further information may be included in advertisement messages as described herein but may also include company or owner providing edge compute resources, subscriber information and availability in subscriber compute systems, cost that may be applicable to accessing compute services, electronic payment location or payment information, and similar data.

At block 916, the security credential provisioning system may establish a list of candidate local mobile edge compute systems. Systems that are unavailable may not provide advertisement messages or the advertisement messages may indicate unavailability. These local MEC systems will not be listed in the candidate local MEC systems. Further, some parameters may eliminate other MEC systems advertising available local compute services including types of wireless connectivity to access the MEC system which may or may not be compatible with the requesting client information handling system. Other parameters to limit the list of candidate MEC systems may be limitations of number of hops allowed or limitations on reported QoS levels or reported data error rates in wireless communication with a wireless transceiver associated with accessing a MEC system. Once a list of candidate local MEC systems is established, flow may proceed to block 918. In other embodiments, if a large plurality of MEC systems responds with advertisement messages for compute, filters may be applied to limit the number of candidate MEC systems. Those filter aspects may be applied based on costs, based on proximity restrictions, or may be limited based on simply a number of first come, first serve respondents.

The security credential provisioning system at block 918 may decode and access secure locations for historical trust references for each candidate MEC system. The security credential provisioning system may establish a link to a secure IP address where the historical trust references are stored for each candidate MEC. In some embodiments, the historical trust references stored at the secure IP address location may be stored as block chains of data or otherwise encrypted for security. The candidate MEC systems will also need to have provided the security credential provisioning system, separately or as part of the advertisement message, access credentials for accessing the underlying historical trust reference data in various embodiments. In some example embodiments, a key for access to a block chain of historical trust references may be provided.

Once decrypted, the historical trust references include a report of a series of previous compute experiences with respect to the candidate MEC system. This may include ability to complete compute work requests, time of completion of an assigned task, reported errors, reported communication difficulties, incidents with security, billing issues, and other reportable aspects of the information handling system. Each block in an example embodiment may include reported data for an episode of compute services provided by the candidate MEC system. The historical trust references are reported by other client information handling systems and may include data relating to the original scope of the compute work request, the connectivity necessary to work with a client information handling system (hops, type of wireless connection, quality of connection, etc.), time of day, and other identifying information.

At block 920, the security credential provisioning system may evaluate the historical trust references for each candidate MEC system. In doing so, the security credential provisioning system may flag any instances of failure to complete compute work requests, any reported incidents of security breaches or introduction of malware, any reported errors or time out episodes, reported payment problems or fraud, or other significant problems identifiable with the provision of the edge compute services. In one example embodiment, one or more instances of the above type events may place the candidate MEC system in an untrustworthy category. No reported events such as the above may place the candidate MEC system in a trustworthy category.

In other embodiments, a series of trustworthiness categories may be designated. For example, if a reported payment issue/fraud, security breach or malware introduction, or a failure to complete compute work requests is recent, a lowest trustworthiness categorization may be applied to the candidate MEC system. If on the other hand, a MEC system has once been subject to malware but the malware incident is older or is known to have been neutralized, one of the medium trustworthiness categorization may be assigned. Further, data errors or failure to complete a requested task within an allocated time may be substantial errors or they may be considered less severe but may nonetheless reduce a trustworthiness categorization below the highest trustworthiness categorization which may be applied to MEC systems with an unblemished record or which have very few incidents reported or which are old and less pertinent.

In another embodiment, the security credential provisioning system may create a trustworthiness rating from the historical trust references records for each candidate MEC for comparison. The trustworthiness rating may be established through application of any algorithm to assess performance of the candidate MEC system. Normalization and weighting factors may provide for comparison of various edge compute performance metrics received in the historical trust references. In an example embodiment, a percentage of on-time completion of contracted compute tasks without error and without security incidents may serve as rating level in one example embodiment relative to a total number of contracted compute tasks performed by an MEC system. For example, a trustworthiness rating value may be out of 100 or rated up to 10 based on the percentage of on-time completion. Such a trustworthiness rating may determined for an MEC system once it has been determined that no highly untrustworthy events such as recent malware or security breaches or failure to complete a contracted compute task have been reported to eliminate the candidate MEC system from consideration.

In one example embodiment, trustworthiness rating value may be weighted or modified by factors such as compute location proximity (as determined by wireless connectivity quality or number of hops), cost levels as applicable, or trust trend values relative to prior trustworthiness score. To apply multiple weighting values, the factors may be normalized at various levels depending on the attributed importance in the trusted compute policy implemented by the security credential provisioning system. The trusted compute policy may be provided by an enterprise administrative server in some embodiments or may be provided as default in other embodiments. A user or administrator may be able to modify the trusted compute policy to emphasize or de-emphasize aspects in some embodiments. In the latter example embodiment, a trust trend having increasing trustworthiness may be assessed by subtracting one or more previous trust scores at previous historical trust reference report time points from a current trust score to determine the change in trust rating over time. Based on the trust trend, an increase may indicate ongoing resolution of problems and a likelihood that the MEC system will satisfactorily perform the request compute tasks. The trust trend may be used to determine ranking or threshold levels to designate a candidate MEC system as an optimal edge compute trust partner.

Additional weighting factors may be multiplied into the determination of a trustworthiness rating value or a trust trend value including weighting factors such as an abundance of current processing capability or memory resources beyond the minimum necessary to complete the compute task. Thus, additional resources may be available if needed to complete the compute task in a time.

For an IoT device QoS levels or latency may be of greater concern where the client device is a low power system with limited computing resources if any. Further, power utilization may be of concern and weighting of the trustworthiness rating value calculation may be impacted by anticipated power consumption needed to communicate with a MEC system. A normalized value of QoS or anticipated latency relative to other candidate MEC systems may be used to influence the trustworthiness rating to assist in selecting MEC systems having less impact on power consumption in some example embodiments.

Upon determination of the trustworthiness categorization or trustworthiness algorithmic rating by the security credential provisioning system, flow may proceed to block 922 for determination of an optimal edge compute partner for the requesting client information handling system. In one example embodiment, one or more optimal edge compute partners may be recommended for the candidate MEC systems that meet a minimum trust level such as a threshold trustworthiness categorization or a minimum threshold trustworthiness rating. In another embodiment, the security credential provisioning system may select one or more optimal edge compute partner based on those candidate MEC systems that have the highest trustworthiness category or trustworthiness rating. Additional aspects may be considered by the mobile security credential provisioning system at this time if not already considered in the weighting calculation of a trustworthiness score value. For example, further narrowing of MEC systems that may qualify as an optimal edge compute partner may be made according to radio proximity to a client information handling system or fewest hops to minimize latencies. In some example embodiments, such as for low power IoT devices or mobile client devices with a reported low power state, the highest QoS wireless link or the MEC with the least likely latency may be selected to minimize power expended by the client information handling system. The energy cost in communicating with the selected optimal edge compute partner when the compute work is being conducted may be minimized for the low power client information handling system. In other embodiments, where Compute aaS is implemented, ranking may be based on lowest cost. In yet other embodiments, a comparison between the current capacities of the candidate MEC to meet the requirements of the compute work request is made and ranking is conducted based upon the current compute or memory resources available at the candidate MEC. If resources above the level requested by the compute work request are available, then the candidate MEC system may be provided as a priority optimal edge compute partner in some embodiments. As stated, the compute work request resource requirements may be provided by a pre-determined level of computing and memory resources selected by a user and associated with the identity of the user, such as provided with the personal authorization credential record in some embodiments.

Proceeding to block 924, if the mobile security credential provisioning system detects that any candidate MEC system has current processing or memory resources insufficient to match those required by the client compute work request, then flow may proceed to block 926. Similarly, if any candidate MEC system is determined to not meet a minimal trustworthiness level, flow may proceed to block 926. At block 926, the security credential provisioning system will make the candidate MEC system unavailable to the client information handling system. A highly untrustworthy candidate MEC system may be barred from utilization to protect the client information handling system.

In some embodiments, it is understood that the available processing and memory resources at MEC system may change dynamically. Thus, the availability of a candidate MEC system may change as resource availability for processing and memory change. It is understood that in some embodiments, the current inability of a MEC system providing an advertisement message of availability to meet the specific requirements of the compute work request may be a basis of elimination from the list of candidate MEC system in the first place. In other embodiments, the dynamic nature of processing and memory resource availability may involve ongoing reporting of those resources by each candidate MEC system. The security credential provisioning system may monitor the processing and memory capacity of the candidate MEC system reporting their availability. Flow returns to block 924 to determine if any additional candidate MEC system are unable to meet a minimum trust level or have insufficient capacity. If no further candidate MEC systems are reporting poor trustworthiness or insufficient capacity, then flow may proceed to block 928.

At block 928, the security credential provisioning system in an embodiment may present one or more local optimal edge compute partners as available to a client information handling system or to an IoT device requesting edge compute resources. A commitment to work may be obtained from the candidate MEC system that will serve as the optimal edge compute partner that is recommended. Further, the client information handling system may be provided the IP address, corresponding wireless link, and the commitment to work for connection with the recommended one or more optimal edge compute partners. At this point the operation of the security credential provisioning system method may end. It is understood that in an example embodiment the security credential provisioning system may operate via a broker node to assess MEC systems in an area local to the client information handling system. The broker node may service an enterprise-operated security credential provisioning system or may operate to provide for subscriber based edge compute resources for a mobile information handling system client seeking additional local compute resources in various embodiments. Other embodiments may include the security credential provisioning system operating, in whole or in part, on a client information handling system seeking edge compute resources as described in embodiments herein.

Figure 10:
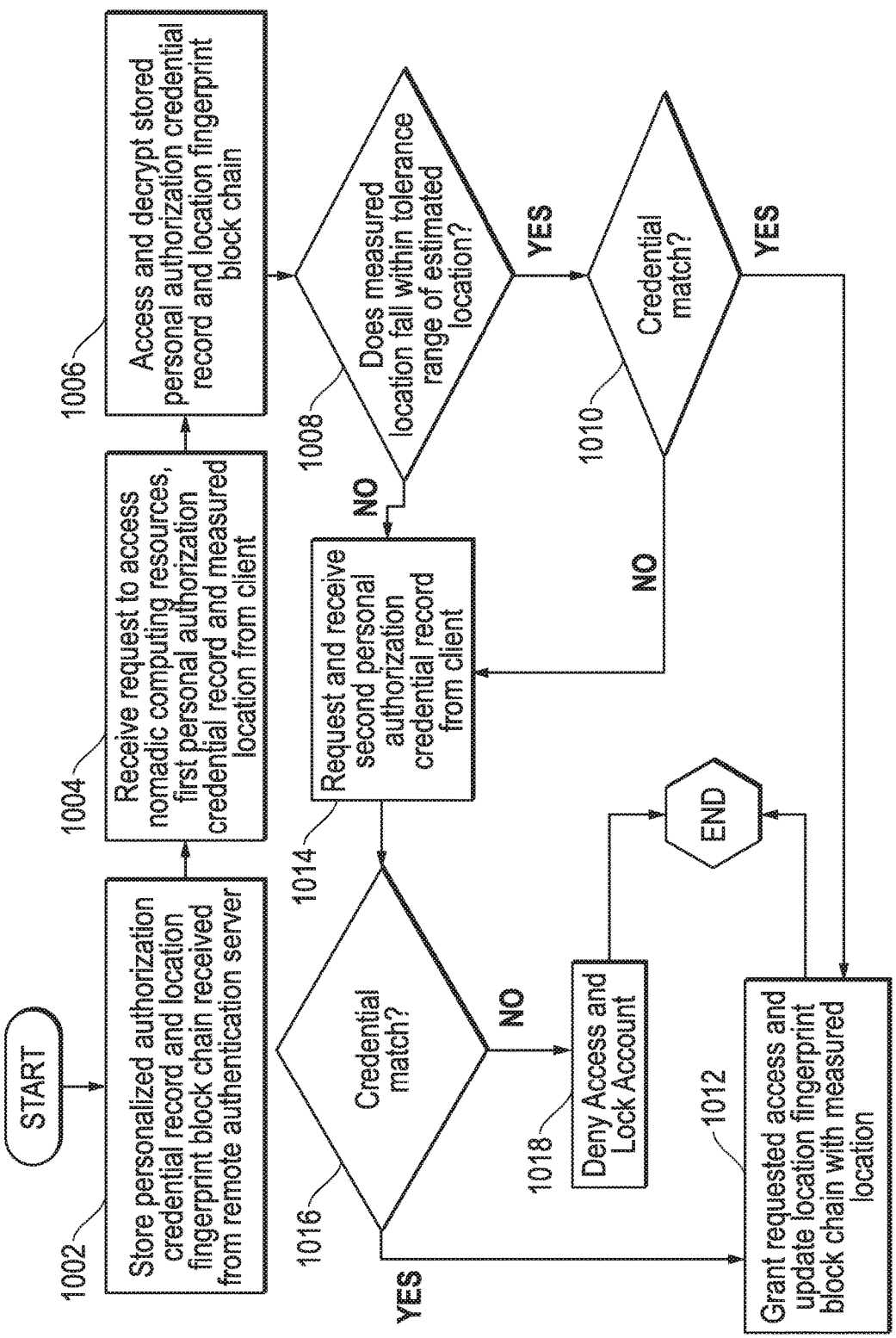
FIG. 10 is a flow diagram illustrating a method of granting access of nomadic computing resources to an authenticated client according to an embodiment of the present disclosure.

FIG. 10 is a flow diagram illustrating a method of authenticating a subscribing client (based on biometric readings of the subscribing client) according to an embodiment of the present disclosure. A security credential provisioning system operating at a selected optimal local authenticate partner in embodiments of the present disclosure may perform a method of authenticating a client requesting access to nomadic computing resources through the use of biometric or other authentication data received from the requesting client. The security credential provisioning system operating at a mobile edge-computing system in an embodiment may only grant access to the requested nomadic computing resources upon verification that the requesting client is the subscribing client as against pre-located personal authorization credential records at the trusted optimal local authenticate partner in an estimated location of a user.

At block 1002, the security credential provisioning system operating at the selected optimal local authenticate partner (a mobile edge-compute system), may receive and store the encrypted personalized authorization credential record and location fingerprint block chain. This may occur in anticipation of the client attempting at a later time to authenticate itself as an authorized subscribing client in order to access the client's nomadic computing resources. At block 1004, in an embodiment, the security credential provisioning system operating at the optimal local authenticate partner may receive an access request to nomadic computing resources, one or more personal authorization credential records, and a measured location of the requesting client. Upon arrival of the client at the future location estimated or set by the authentication server, in an embodiment, the client may proceed to request access to nomadic computing resources, as anticipated. In doing so, the client may transmit to the optimal local authenticate partner one or more personal authorization credential records or authentication data (e.g. biometric readings, username, password, encryption key, secret question/answers) in order to authenticate the requesting client as an authorized user of the nomadic computing resources. The client information handling system may also measure its current location, for example, using a GPS location circuit, and may transmit that measured location to the local authenticate partner.

The first personal authorization credential record input in an embodiment may take the form of any identifying data record, including but not limited to biometric information, password, client names, encryption keys, secret questions, and secret answers. Biometric information in an embodiment may include but may not be limited to voice recognition methods, facial recognition methods, gesture recognition methods, retinal scanning methods, fingerprint or palm print scanning methods, and/or infrared thermal signature reading methods.

As described above, each of the client information handling systems through which a client may attempt to access nomadic computing services may include identification systems capable of identifying the subscribing client via biometric readings. For example, the client IHS 2 in an embodiment may be a wall-mounted computing device, and may include a voice ID system, a visual ID system, a hand ID system, and other biometric identification systems known in the art. In an embodiment, an information handling system that includes one or more of the voice ID system, visual ID system, and/or hand ID system may passively identify the client as the client enters the nearby vicinity of that information handling system. For example, client IHS 2 in an embodiment may detect the presence of the client within the nearby vicinity of client IHS 2 via recorded client biometrics, without the client actively attempting to register his presence with client IHS 2. Upon recording biometric information positively identifying the client in such an embodiment, the information handling system that performed the biometric measurements in an embodiment may transmit the biometric information positively identifying the client directly to the local authenticate partner.

At block 1006, in an embodiment, the security credential provisioning system operating at the optimal local authenticate partner may access and decrypt the stored personal authorization credential record and location fingerprint block chain. The personal authorization credential record and location fingerprint block chain received and stored at block 1002 in an embodiment may be encrypted. The personal authorization credential record received from the requesting client at block 1004 may include a decryption key that the security credential provisioning system can use at block 1006 to decrypt the encrypted personal authorization credential record and location fingerprint block chain received from the authentication server.

At block 1008, in an embodiment, the security credential provisioning system operating at the local authenticate partner may determine and verify the requesting client's location is within tolerance of the estimated subscriber location. As described above, the security credential provisioning system operating at the authentication server may estimate the future location of the client based on location fingerprint block chain entries received from a remote authentication server and decrypted at the local authenticate partner. As described above, the security credential provisioning system in one example embodiment may access a previously received and stored state variable for a client information handling system previously verified as being in use by the subscriber, and estimate using a linear-quadratic estimation that the client will likely have a future location of 40.698, and −74.32 degrees (at her office) at a later time of 16:35:18 GMT on Jun. 1, 2017 based upon these state values. In another example embodiment, the security credential provisioning system in one example embodiment may access the previously received and stored most popular location of the subscribing client, and set the client future location at her office, based on this information.

In either or both of these example embodiments, the security credential provisioning system operating at a local authenticate partner may receive and store a measurement location of the information handling system requesting access to the subscriber's nomadic computing services. The security credential provisioning system operating at the local authenticate partner in such an embodiment may then verify that the measured location of the requesting information handling system falls within a range equal to or lesser than the confidence interval value from the future location, as described in the location fingerprint block chain. If the measured location falls within tolerance range of the estimated future location, the flow may proceed to block 1010. If the measured location does not fall within tolerance range of the estimated future location, the flow may proceed to block 1014.

At block 1010, the security credential provisioning system operating at the local authenticate partner in an embodiment may determine whether the first personal authorization credential record input matches the stored personal authorization credential record received from the authentication server. As described above, security credential provisioning system operating at the local authenticate partner may have received from a remotely located authentication server a location fingerprint block chain, and a personal authorization credential record associated with a subscribing client. The personal authorization credential record received from the authentication server in an embodiment may include several types of personal authorization credential records, and a personal authorization credential record value associated with each type of personal authorization credential record.

For example, the personal authorization credential record and associated values in an embodiment may include, user name personal authorization credential record having a value of "client 1," a password personal authorization credential record having a value of "PASS," a private key personal authorization credential record having a value that includes a long-string alpha-numeric value, a visual ID signature personal authorization credential record having a value that links to a visual recognition system data record (e.g. facial recognition data record, retinal scan data record, movement detection data record, etc.), a voice ID signature personal authorization credential record having a value that links to a voice recognition system data record, a hand ID signature personal authorization credential record having a value that links to a hand ID recognition system data record (e.g. thumbprint scan, palm print scan), a location ID signature personal authorization credential record having a value that links to the most recent time-stamped block in a location fingerprint block chain associated with the subscribing client, a secret question personal authorization credential record having a value of "what was the name of your first pet?," and/or a secret answer personal authorization credential record having a value of "Scooby."

The security credential provisioning system operating at the local authenticate partner in an embodiment may compare first personal authorization credential record input received from the client information handling system requesting access to these stored personal authorization credential record values. For example, the security credential provisioning system operating at the local authenticate partner in an embodiment may compare a first personal authorization credential record input including a voice recording of the requesting client to a voice recognition system data record stored within the personal authorization credential records received from the authentication server to determine whether they match. If the security credential provisioning system operating at the local authenticate partner in an embodiment determines the first personal authorization credential record input received from the client information handling system requesting access matches stored, pre-located personal authorization credential record values, the flow may proceed to block 1012. If the security credential provisioning system operating at the local authenticate partner in an embodiment determines the first personal authorization credential record input received from the client information handling system requesting access does not match stored personal authorization credential record values, the flow may proceed to block 1014.

At block 1108, if the security credential provisioning system operating at the local authenticate partner in an embodiment determines the first personal authorization credential record input received from the client information handling system requesting access matches stored personal authorization credential record values, the security credential provisioning system operating at the local authenticate partner may grant the requested access and update the location fingerprint block chain with the measured location received from the client information handling system at block 1004. Upon receipt of a first personal authorization credential record matching a stored record of personal authorization credential records received from the authentication server, the security credential provisioning system operating at the local authenticate partner may identify the requesting client as the subscribing client, and may grant access to the subscribing client's nomadic computing services. As described above, in some embodiments the local authenticate partner may both grant access to and deliver the nomadic computing services, while in other embodiments, the local authenticate partner may grant access to the nomadic computing services, and identify a separate mobile edge-compute system to deliver the nomadic computing resources.

At block 1014, if the security credential provisioning system operating at the local authenticate partner in an embodiment determines the first personal authorization credential record input received from the client information handling system requesting access does not match stored personal authorization credential record values, or if the security credential provisioning system determines the measured location of the client information handling system does not fall within tolerance range of the estimated future location, the security credential provisioning system operating at the local authenticate partner may transmit a request for a second personal authorization credential record input to the client requesting access. For example, in an embodiment in which the client information handling systems through a wall-mounted computing device IHS 2 that includes a voice ID system, a visual ID system, a hand ID system, and other biometric identification systems known in the art, IHS 2 may passively take a biometric reading of a person nearby IHS 2. If this person is not the authorized subscribing client, when IHS 2 transmits the biometric reading of this unknown person to the local authenticate partner for verification of personal authorization credential records, the local authenticate partner may determine this biometric reading does not match the stored personal authorization credential records for the subscribing client. In such a scenario, the local authenticate partner may transmit a request back to IHS 2 for a second personal authorization credential record input it can successfully match to the stored personal authorization credential records for the subscribing client.

This scenario may occur whether or not the authorized subscribing client is present nearby IHS 2 and attempting to access nomadic computing resources. For example, the unknown person may simply be closer to the biometric reading systems of IHS 2 than the subscribing client, and the biometric reading systems scanned the unknown person rather than the subscribing client as a consequence. However, in another example, IHS 2 may sense the presence of a person nearby and assumed that the unknown person is the subscribing client. In such an example embodiment, although this person is not the authorized client and the authorized subscribing client is not present, IHS 2 may have nonetheless attempted to access the nomadic computing resources. In either scenario, the local authenticate partner may respond by requesting a second personal authorization credential record input to authenticate the person present nearby IHS 2 is the subscribing client. For example, the local authenticate partner may transmit a request for the client to provide a secret answer to the client's secret question "what was the name of your first pet?" as stored in the received personal authorization credential record.

At block 1016, the security credential provisioning system operating at the local authenticate partner in an embodiment may determine whether the client has correctly provided the second personal authorization credential record input. In an embodiment, the security credential provisioning system operating at the local authenticate partner may receive a second personal authorization credential record input from the requesting information handling system in response to the request transmitted at block 1014. Upon receipt of the second personal authorization credential record input, the security credential provisioning system operating at the local authenticate partner may compare it to stored personal authorization credential record values received from the authentication server to determine whether the requesting client is the authenticated subscribing client.

For example, the local authenticate partner may receive a secret answer of "Scooby" in response to the request to answer the secret question "what was the name of your first pet?" The security credential provisioning system operating at the local authenticate partner in such an embodiment may compare the received response of "Scooby" against the stored secret answer "Scooby" in the client's credential data record received from the authentication server, and determine the second personal authorization credential record input is correct. If the security credential provisioning system operating at the local authenticate partner in an embodiment receives a correct second personal authorization credential record input, the method may proceed to block 1012, and the security credential provisioning system operating at the local authenticate partner may grant access to the subscribing client's nomadic computing services. If the security credential provisioning system operating at the local authenticate partner in an embodiment receives an incorrect second personal authorization credential record input, the method may proceed to block 1018.

At block 1018, in an embodiment, the security credential provisioning system may lock the client account, denying access to the subscriber's nomadic computing services from any requesting mobile information handling system. If the client of the information handling system requesting access cannot establish it is the authorized subscriber by supplying a correct second personal authorization credential record, as determined above at block 1016, the security credential provisioning system may also assume the requesting information handling system is not being operated by the authorized subscriber, and that the subscriber's nomadic computing services are currently under attack from a malicious remote hack. In such a scenario, the security credential provisioning system in an embodiment may lock the client account by transmitting a message to the remote authentication server to deny access to the subscriber's nomadic computing services to any information handling system requesting access.

The blocks of the flow diagrams of FIGS. 8-11 or steps and aspects of the operation of the embodiments herein and discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system of a mobile edge-computing system operating a nomadic computing authentication system comprising:
   a memory receiving a predicted location of a client with a predicted location tolerance;
   the memory receiving a pre-located, encrypted set of personal authorization credentials;
   a processor executing machine readable executable code instructions to:
      detect an access attempt by the client including identification of the client at a first location and a first personal authorization credential record;
      determine whether the access attempt indicates the client is within the predicted location tolerance of the predicted location of the client;
      determine whether the first personal authorization credential record is matched in the personal authorization credential record;
      identify a plurality of mobile edge computing systems located within a preset range of the first location if the first location is within the predicted location tolerance and the first personal authorization credential record is matched; and
      select an optimal edge compute partner system from among the plurality of mobile edge computing systems located within a preset range of the first location based on a minimum historical trust category rating determined from historical trust references accessed for the optimal edge compute partner system.

2. The information handling system operating the system of claim 1 further comprising:
   the processor executing code instructions to:
      select the optimal edge compute partner system further based on a highest historical trust category or rating from among mobile edge computing systems determined from historical trust references accessed for the plurality of mobile edge computing systems.

3. The information handling system operating the system of claim 1 further comprising:
   the processor executing code instructions to:
      select the optimal edge compute partner system from among the plurality of mobile edge computing systems located within a preset range of the first location further based on an ability to meet an identified mobile edge-computing system resource requirement associated with the client access request.

4. The information handling system operating the system of claim 3 wherein the mobile edge-computing system computing resource requirement is a memory requirement.

5. The information handling system operating the system of claim 3 wherein the mobile edge-computing system computing resource requirement is a processing requirement.

6. The information handling system operating the system of claim 1 further comprising:
   the processor executing code instructions to:
      transmit a request for a second personal authorization credential record input if the access attempt indicates the client is not within the predicted location tolerance of the predicted location of the client; and
      if the personal authorization credential record input fails to match in the personal authorization credential record, denying access to the nomadic computing services.

7. The information handling system operating the system of claim 1 further comprising:
   the processor executing code instructions to:
      transmit a request for a second personal authorization credential record input if the first personal authorization credential record is matched in the personal authorization credential record; and
      if the personal authorization credential record input matches in the personal authorization credential record, granting access to the optimal edge compute partner system for nomadic computing services.

8. An information handling system of a mobile edge-computing system operating a nomadic computing authentication system comprising:
   a memory receiving a predicted location of a client with a predicted location tolerance;
   the memory receiving a pre-located, encrypted set of personal authorization credentials;
   a processor executing machine readable executable code instructions to:
      identify a plurality of mobile edge computing systems located within a preset range of the predicted future location;
      select an optimal edge compute partner system from among the plurality of mobile edge computing systems located within a preset range of the predicted future location based on a minimum historical trust category rating determined from historical trust references accessed for the optimal edge compute partner system;
      detect an access attempt by the client including identification of the client at a first location and a first personal authorization credential record, wherein the first personal authorization credential record is a biometric measurement;
      determine whether the access attempt indicates the first location is within the predicted location tolerance of the predicted location of the client;
      decrypt the personal authorization credential record and determine whether the first personal authorization credential record is matched in the personal authorization credential record; and if the first location is within the predicted location tolerance and the first personal authorization credential record is matched, grant access to the optimal edge compute partner system for nomadic computing services.

9. The information handling system operating the system of claim 8 further comprising:
the processor executing machine readable executable code instructions to:
transmit a challenge request to the client for a second personal authorization credential record if the first personal authorization credential record does not match the decrypted personal authorization credential record; and
allow access to the mobile edge computing system upon receipt of the second personal authorization credential record matching the decrypted personal authorization credential record.

10. The information handling system operating system of claim 9 further comprising:
the processor executing machine readable executable code instructions to:
disallow access by the requesting client and future requesting clients upon receipt of a second personal authorization credential record not matching the decrypted personal authorization credential record.

11. The information handling system of claim 8, wherein the first personal authorization credential record is a data record generated by a gesture identification system.

12. The information handling system of claim 8, wherein the first personal authorization credential record is a data record generated by a voice recognition system.

13. The information handling system of claim 8, wherein the first personal authorization credential record is a data record generated by a facial recognition system.

* * * * *